(12) United States Patent
Antal et al.

(10) Patent No.: US 7,577,091 B2
(45) Date of Patent: Aug. 18, 2009

(54) CLUSTER-BASED NETWORK PROVISIONING

(75) Inventors: Csaba Antal, Kiskunlacháza (HU); János Harmatos, Budapest (HU); Alpár Jüttner, Budapest (HU); Lars Westberg, Enköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 703 days.

(21) Appl. No.: 10/939,970

(22) Filed: Sep. 14, 2004

(65) Prior Publication Data

US 2005/0169179 A1    Aug. 4, 2005

Related U.S. Application Data

(60) Provisional application No. 60/541,365, filed on Feb. 4, 2004.

(51) Int. Cl.
*H04L 12/26* (2006.01)
(52) U.S. Cl. ...................................... 370/229
(58) Field of Classification Search ......... 370/229–240, 370/254; 709/229–240, 223–226
See application file for complete search history.

(56) References Cited

U.S. PATENT DOCUMENTS

| | | | | |
|---|---|---|---|---|
| 5,872,918 | A * | 2/1999 | Malomsoky et al. | 709/222 |
| 6,728,777 | B1 * | 4/2004 | Lee et al. | 370/230 |
| 6,914,883 | B2 * | 7/2005 | Dharanikota | 370/235 |
| 2003/0033425 | A1 * | 2/2003 | Deshpande | 709/233 |
| 2003/0187970 | A1 | 10/2003 | Chase et al. | |
| 2003/0204623 | A1 | 10/2003 | Cain | |
| 2004/0190517 | A1 * | 9/2004 | Gupta et al. | 370/392 |
| 2005/0080883 | A1 * | 4/2005 | Nurminen et al. | 709/221 |

FOREIGN PATENT DOCUMENTS

| WO | 01/69851 A2 | 9/2001 |
|---|---|---|
| WO | 02/098034 A1 | 12/2002 |

OTHER PUBLICATIONS

Szabó, "On Call Admission Control for IP Telephony in Best Effort Networks", Computer Communications, 26, 2003, pp. 304-313.

(Continued)

*Primary Examiner*—Hassan Kizou
*Assistant Examiner*—Joshua Smith
(74) *Attorney, Agent, or Firm*—Nixon & Vanderhye P.C.

(57) ABSTRACT

In the area of network provisioning, there is a problem of selecting a suitable traffic-provisioning model for large networks due to the high management complexity of the resource-efficient trunk model and the poor bandwidth efficiency of the easy-to-configure hose model. The invention is based on the idea of partitioning at least part of the network into multi-node clusters, and defining traffic limitations on at least two levels, including the intra-cluster level and the inter-cluster level, where the traffic limitations include one or more node-to-cluster traffic limitations for inter-cluster traffic. Subsequently, cluster-based provisioning of the network is performed based on the traffic limitations. The novel node-to-cluster limitations proposed by the invention are preferably applied in a cluster-based trunk or hose model on the inter-cluster level. In other words, for the description of the inter-cluster traffic (traffic between the clusters) cluster-based trunk or hose models can be used, preferably depending on the available information about the traffic. The cluster-based provisioning makes it possible to find a trade-off between management complexity and overprovisioning.

28 Claims, 16 Drawing Sheets

OTHER PUBLICATIONS

Szabó, "Performance Evaluation of a New End-to-End Measurement Based Call Admission Control Scheme for Supporting IP Telephony", SCS International Symposium on Performance Evaluation of Computer and Telecommunications Systems, Orlando, FL, Jul. 2001.

Fingerhut et al, "Designing Least Cost Nonblocking Broadband Networks", Journal of Algorithms, vol. 24, No. 2, Aug. 1997, pp. 287--309.

Duffield et al, "Resource Management with Hoses: Point-to-Cloud Services for Virtual Private Networks", ACM Sigcomm, San Diego, California, Aug. 1999.

Kumar et al, "Algorithms for Provisioning Virtual Private Networks in the Hose Model", IEEE/ACM Transactions on Networking, vol. 10, No. 4, Aug. 2002.

Italiano et al, "Restoration Algorithms for Virtual Private Networks in the Hose Model", IEEE Infocom, New York, Jun. 2002.

Cinkler et al, "Stochastic algorithms for design of thrifty single-failure-protected networks", DRCN 2000, 2000.

Pióro et al, "Solving multicommodity integral flow problems by simulated allocation", Telecommunication Systems 7, vol. 1, No. 13, pp. 17 28, 1997.

Minoux, "Network synthesis and optimum network design problems: Models, solution methods and applications", NETWORK, vol. 19, 1989, pp. 313-360.

Jüttner et al, "On bandwidth efficiency of the hose resource management model in virtual private networks", IEEE Infocom, Apr. 2003.

Pióro et al, "Topological design of telecommunication networks: Nodes and links localization under demand constraints", in 17th International Teletraffic Congress, Salvador de Bahia, Sep. 2001.

Pióro et al, "Topological design of MPLS networks", in Global Communication Conference(GLOBECOM 2001), San Antonio, Texas, USA, Nov. 2001.

Maliosz et al, "Methods for Optical VPN Design over Multifiber Wavelength Routing Networks", in Proc. ONDM, Budapest, Hungary, Feb. 2003.

Maliosz et al, "Optimizing Configuration of Virtual Private Networks", in Proc. Polish-Czech-Hungarian Workshop, Sep. 2001, pp. 241 247.

Cinkler et al, "Configuration of Protected Virtual Private Networks", in Proc. Third International Workshop on Design of Reliable Communication Networks, Oct. 2001.

Mitra et al, "VPN Designer: A Tool for Design of Multiservice Virtual Private Networks", in Proc. 8th International Telecom. Network Planning Symp, NETWORKS 98, Sorrento, Italy, 1998, pp. 153-158.

Chuah, "A Scalable Framework for IP-Network Resource Provisioning Through Aggregation and Hierarchical Control", University of California, Berkeley, 2001.

International Search Report mailed May 13, 2005 in corresponding PCT application No. PCT/SE2004/001965.

M. Berkelaar et al., "lp_solve 4.0", at ftp://ftp.es.ele.tue.nl/pub/lp_solve; downloaded from http://groups.yahoo.com/group/lp_solve/files on Jul. 21, 2008.

* cited by examiner

CLUSTER-BASED NETWORK PROVISIONING

This application claims priority to U.S. provisional Application No. 60/541,365, filed 04 Feb. 2004. The entire contents of this application is incorporated herein by reference.

TECHNICAL FIELD

The present invention generally relates to network provisioning for networks such as mobile core networks and Virtual Private Networks (VPNs), and more particularly to dimensioning and admission control in such networks.

BACKGROUND

Network provisioning generally relates to resource allocation and management in a network and often includes issues such as admission control and/or dimensioning of the network.

A substantial tendency is that the number of network nodes that form a network is growing fast, resulting in a large, complex network structure and virtual topology. In parallel with this tendency, the traffic volume between the network nodes is also growing continuously and is often difficult to predict. Traffic between nodes is also hard to measure because of the large number of nodes and traffic trunks. Therefore, the calculation of the traffic matrix is very complicated. In most of the cases it is not even possible to calculate the traffic matrix. Furthermore, the degree of traffic changes, requiring reconfiguration of the network, is also very hard to forecast.

The area of resource management includes some currently open problems. To achieve good network utilization, the best possible characterization of the customer's traffic flows is required. Supporting a variety of customer applications typically requires a Service Level Agreement (SLA) between the network provider and the customer, specifying the Quality of Service (QoS) and bandwidth requirements. Currently there are two ways to define the SLA and exercise admission control, namely the trunk-based (customer-pipe) model and the hose-based model, which both are static models.

Admission control is an essential component of any network provisioning architecture, and is generally a question of controlling the number of connections that utilize a given set of resources in a communication network, thereby ensuring that admitted connections have access to the resources that are required to fulfil their Quality of Service (QoS) requirements. On the link level, admission control normally serves to restrict the number of connections simultaneously present on a transport link in the network. This means that new connections may be rejected in order to protect connections that are already admitted for transport over the link.

The issue of connection admission control is generally quite complex, and for networks such as Universal Mobile Telecommunications System (UMTS), Virtual Private Networks (VPNs) and similar communication networks the main problem is to find an efficient admission control strategy that works and at the same time fulfils practical requirements such as limited complexity and high accuracy.

Trunk Model

A simple service model, or traffic provisioning model, for a transport network is to emulate the private line service. This would require a client node to specify the bandwidth requirement between every possible source-destination pair. This model, the trunk model, is depicted in FIG. 1.

When a transport network is based on the trunk model, then a mesh of trunks is created, each trunk extending from one customer endpoint to another. A customer endpoint must maintain a logical interface for each of its trunks. In the context of a UMTS core transport network for example, the customer endpoint is typically a Media Gateway (MGW) or equivalent node.

For the trunk model it is normally expected to give the point-to-point traffic demands. In other words, the specification of the traffic matrix is needed. This model enables the network provider to utilize the network in the best way, since the known traffic matrix and routing strategy exactly determine the required link capacities. On the other hand, a critical part of this model is that the communication pattern between the end-points is very difficult to describe. It is a justified assumption that the network provider has very limited information about the traffic matrix, and the customer is unable to exactly predict and define the loads between the nodes. Consequently, in case of an unknown traffic matrix, the application of the trunk or customer-pipe model is quite limited, especially in the VPN context. Another problem with this model is the significant management complexity. In each node, incoming and outgoing traffic description parameters have to be defined for each associated node to define the required capacities in relation to the associated nodes. In case of a full mesh logical network, the sum of parameters to be configured is proportional to the square of the number N of nodes in the considered network or part of the network.

Hose Model

In the hose model, which is another traffic provisioning model, a customer specifies a set of endpoints to be connected. The connectivity between endpoints in the network is specified by a hose, comprising:

The capacity required for aggregate outgoing traffic from the endpoint into the network (to the other end-points), The capacity required for aggregate incoming traffic from the network to the endpoint (from the other end-points).

When transport network dimensioning is based on the hose model, then a customer endpoint maintains just one logical interface, a hose, to the provider access router. FIG. 2 shows an exemplary implementation of a hose using edge-to-edge pipes.

Using the hose model, the traffic matrix is not required, only the incoming and outgoing traffic volumes need to be known for each node. These traffic parameters can be measured or predicted in a more exact way compared to the trunk model. Thus, the hose model is very attractive from the viewpoint of the customer, but it is not so advantageous for the network provider since it implies traffic uncertainty in that the sink nodes are not known. The network must be dimensioned for the worst case traffic distribution, which may cause significant overdimensioning in the network. From the viewpoint of management complexity, the hose model requires significantly less parameters than the trunk model. Since only the aggregated incoming and outgoing traffic volumes have to be defined in each node, the number of parameters to be configured is proportional to the number of nodes in the network.

Measurement Based Admission Control

Yet another type of traffic provisioning model is Measurement Based Admission Control (MBAC). In particular, drop-based MBAC, which is an example of end-to-end measurement based admission control, is known from references [1] and [2]. In MBAC, a node measures the network performance to guide the admission control decisions. For example, the data receiver monitors the user plane packet flows per remote site and detects dropped packets by comparing the Real-time Transfer Protocol (RTP) sequence numbers. A dropped packet is an indication of congestion in the IP backbone and RTP provides a mechanism to detect dropped or out-of-sequence packets. The node admits a new call only if the loss rate towards the remote site in question is below a given threshold value. Given that the queuing delays are likely to be quite small, the quality of service is measured strictly in terms of packet loss.

Admission control decisions in the case of measurement-based provisioning are always based on the actual performance of the network, so all unexpected situations are handled properly. For example, if congestion occurs on a link in multiple-fault situations then packet loss is measured in the data receiver, which blocks further calls until the congestion disappears.

However, measurement-based admission control has the drawback that proper QoS may not be guaranteed if the drop requirement is strict, for example in the backbone network of a UMTS system. This may prevent the use of drop-based MBAC in many applications.

The main features of the prior art traffic provisioning models are summarized in the table below.

| Property | Static models | | |
|---|---|---|---|
| | Trunk | Hose | Drop-based MBAC |
| Configuration | 2 * (N − 1) entries per node | 2 entries per node | — |
| Bandwidth efficiency for proper QoS provisioning | high | low | May be impossible to guarantee proper QoS |
| Handling of unexpected congestion | Not supported | Not supported | Supported |

In summary, static admission control can be based on trunk or hose models.

The trunk model, where admission control is based on virtual point-to-point trunks defined in the nodes, enables the network provider to utilize the network in the best way, resulting in more effective network operation. However, the trunk model requires a lot of configuration parameters in all nodes to describe the traffic towards the other sink nodes according to the SLA. The complexity of the trunk configuration grows fast, actually it is proportional to the square of the number of network nodes, and therefore can generally not be used in a large-scale network. If a new node is added to the network, a new trunk must be defined and configured with a capacity limit in all other nodes. Another important problem with the trunk model is that the traffic matrix is not or just partly known. On the other hand, the main advantage of the trunk model is that it offers the best bandwidth efficiency among the available static provisioning methods.

Using the hose model, where admission control in the nodes does not check the destination of the calls, the configuration is much simpler. Only incoming and outgoing traffic description entries need to be configured in the nodes. Furthermore, the hose parameters can be measured or predicted in a simple way. The major drawback of the hose model is that it normally causes significant overdimensioning in the network. Configuration of network nodes in the case of hose model is very simple; in fact only two parameters should be configured in each node. When a new node is added to the system, then the configuration of the other nodes is not affected. However, bandwidth efficiency of the hose model is worse than that of the trunk model.

Therefore, there could be large core networks, large VPNs or other large networks where neither trunk nor hose provisioning is applicable due to management complexity or poor bandwidth efficiency, respectively.

RELATED ART

In the literature, papers dealing with hose or trunk model based network dimensioning can be found.

The main concept of the hose model has long been present in the literature under the theory of "non-blocking networks". For example, reference [3] presents a network design methodology based on just the same resource-provisioning concept as the hose model.

Reference [4] presents an analysis of the bandwidth efficiency of the hose model for provisioning IP Virtual Private Networks. The evaluation is based on trace-driven simulations of traffic derived from a voice network and from a large corporate network. They provide numerical results for network-wide capacity demand for different hose realizations. The comparison of the bandwidth efficiency of the traditional pipe and hose models is limited to the access links, although the real overprovisioning required by the hose model will be present within the backbone network.

In reference [5] it is argued that an optimal cost solution for hose realizations should be based on a tree topology, and it is proved that the general problem with asymmetric hoses (different amount of traffic sent and received by the hose) and constrained link capacities is NP-hard (NP, Non-Polynomial). In view thereof, approximation algorithms with provable performance bounds were presented in [5].

The most recent important contribution in this field can be found in reference [6], which proposes restoration algorithms to improve the tree-based hose realization.

Reference [7] provides a detailed comparison of the resource efficiency of the hose and the trunk resource allocation models. It was concluded that the overprovisioning factor of the hose model can be reasonably low for smaller networks (especially in the case of tree routing). However, the overprovisioning factor increases considerably with the size of the network in the case of shortest path routing. It is shown that the hose model gives poor bandwidth efficiency if it is combined with bandwidth reservation for LSPs. Its bandwidth efficiency is further degraded when routing is done with CSPF.

A number of representative papers regarding the trunk model are given below.

Reference [8] provides a detailed survey of various possible network design tasks related to the trunk model. A general framework is proposed and several special cases that are relevant in the design of telecommunication networks are identified. The method is also able to handle different cost models.

References [9], [10] and [11] concern methods to solve various telecommunication network design tasks.

Other heuristics were proposed in reference [12] for designing failure-tolerant networks.

Further references [13], [14], [15] and [16] deal with the questions of designing Virtual Private Networks with or without failure protection capability.

A common attribute of all the above trunk reservation methods is that they do not take the complexity of the configuration into the account but they aim at designing networks requiring least capacity devices.

In reference [17], the objective is to implement existing connection admission control (CAC) in a distributed control architecture to regulate end-to-end resource provisioning over IP networks. The proposed technique is applicable in hierarchical networks based on basic domains, especially for the multiple ISP scenario The technique is based on the traditional trunk model and clustering is employed in order to make it possible to implement the distributed CAC method and to establish traffic aggregation. In particular, they use an admission control strategy based on a full traffic matrix with an aggregate reservation based on a Gaussian traffic predictor.

SUMMARY OF THE INVENTION

It is a general object of the invention to provide an improved network provisioning strategy.

It is an object of the invention to provide a new efficient admission control strategy, as well as a corresponding network dimensioning mechanism.

It is a particular object to provide a scalable (in terms of management complexity) and at the same time resource-efficient admission control and dimensioning strategy.

It is a specific object to provide an improved method and arrangement for provisioning communication networks.

It is another specific object to provide a design and/or support tool that among other things can be used for network dimensioning purposes.

Yet another specific object of the invention is to provide a novel admission controller for operation in a communication network.

In the prior art, as we have seen, there is a general problem of selecting a suitable traffic provisioning model for large networks due to the high management complexity of the resource-efficient trunk model and the poor bandwidth efficiency of the easy-to-configure hose model.

In an embodiment, at least a part of the network is partitioned into clusters, where each cluster has at least two nodes, and defining traffic limitations on at least two levels, including the intra-cluster level and the inter-cluster level, where the traffic limitations include one or more novel node-to-cluster traffic limitations for the inter-cluster traffic. Cluster-based provisioning of the network is performed based on the defined traffic limitations. Using cluster-based provisioning in this way makes it possible to find an optimal equilibrium or trade-off between management complexity and overprovisioning.

In the traditional trunk model there are node-to-node traffic limitations, while in the traditional hose model there are only node-to-anywhere traffic limitations. In the model proposed, the traffic can (also) be subjected to one or more node-to-cluster limitations. It should be understood that the expression "node-to-cluster limitation" normally means a limitation, for a given node in a given cluster, of the amount of traffic in relation to at least one other cluster. In general, the limitation(s) may be related to traffic in the incoming and/or outgoing direction.

The novel node-to-cluster limitation or limitations are preferably applied in a so-called cluster-based trunk or a cluster-based hose model on the inter-cluster level. In other words, for the description of the inter-cluster traffic (traffic between the clusters) a cluster-based trunk or hose model can be used, preferably depending on the available information about the traffic. It is also possible to group the clusters and independently select so-called inter-hose or inter-trunk provisioning for each group of clusters.

The intra-cluster traffic (traffic between the nodes that belong to a common cluster) may be described by the traditional trunk or hose models, independently cluster by cluster if desired. This implies that a traffic description model or bandwidth allocation model can be selected independently for each cluster in the network, providing a higher degree of flexibility compared to prior art network provisioning.

Selecting between trunk and hose models for intra-cluster provisioning and between cluster-based trunk and hose models for inter-cluster provisioning gives the following basic combinations:
  intra-trunk, inter-trunk;
  intra-hose, inter-trunk;
  intra-trunk, inter-hose; and
  intra-hose, inter-hose.

There is also another trade-off between the traditional trunk and hose models. The trunk model is quite sensitive to changes in the structure of the traffic, while the hose model is very robust and thus less sensitive to such changes. The provisioning strategy is also capable of controlling this trade-off.

Extensive research and simulations have shown that the intra-hose, inter-trunk provisioning provides the best overall performance in many traffic applications and scenarios.

The proposed service model thus allows us to define service level definitions such as Service Level Agreements (SLAs)—based on the concept of site/node clusters—in a more flexible way than the pure hose and trunk models. By defining a cluster as a set of network sites/nodes, we can differentiate between intra-cluster provisioning and inter-cluster provisioning in the service level definition.

The cluster-based provisioning generally relates to resource allocation and/or network management, and preferably includes admission control and/or network dimensioning.

For cluster-based admission control, the node-to-cluster traffic limitation or limitations in the service level definition or SLA are preferably applied for admission control on the inter-cluster level. On the intra-cluster level, supplementary intra-traffic limitations defined in the SLA may be applied as and when desired.

For cluster-based dimensioning, the capacity of a number of links in the network is preferably dimensioned based at least partly on the node-to-cluster traffic limitation(s) on the inter-cluster level. Typically, the dimensioning task is also based on at least one supplementary traffic limitation on the intra-cluster level.

The dimensioning task is preferably performed by a network design or support tool that calculates the required link capacities based on at least a subset of the traffic limitations given in the cluster-based service level definition or SLA. Integrating such a design tool in a network management module having cluster-based admission control functionality operating based on the same traffic limitations in the SLA ensures that the network resources and the CAC configurations are in fact aligned.

Some advantages include:
  Simple implementation—only a few changes are required in the nodes;
  Scalable management complexity;
  Near-optimal trade-off between scalability and bandwidth efficiency;
  The proposed provisioning model is applicable effectively even if the operator has no exact information about the traffic distribution in the network.

BRIEF DESCRIPTION OF THE DRAWINGS

The invention, together with further objects and advantages thereof, will be best understood by reference to the following description taken together with the accompanying drawings, in which.

DESCRIPTION OF EMBODIMENTS OF THE INVENTION

Figure 1:
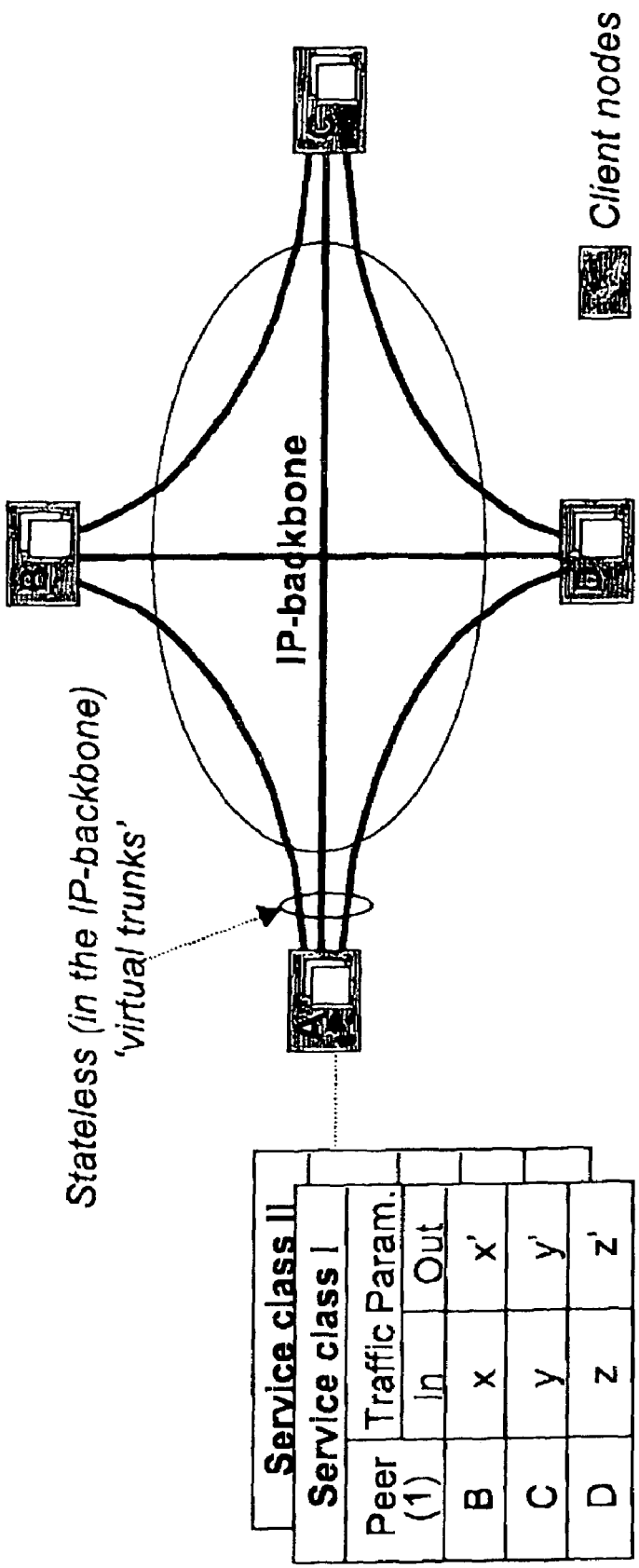
FIG. 1 is a schematic illustration of the traditional trunk model.
Figure 2:
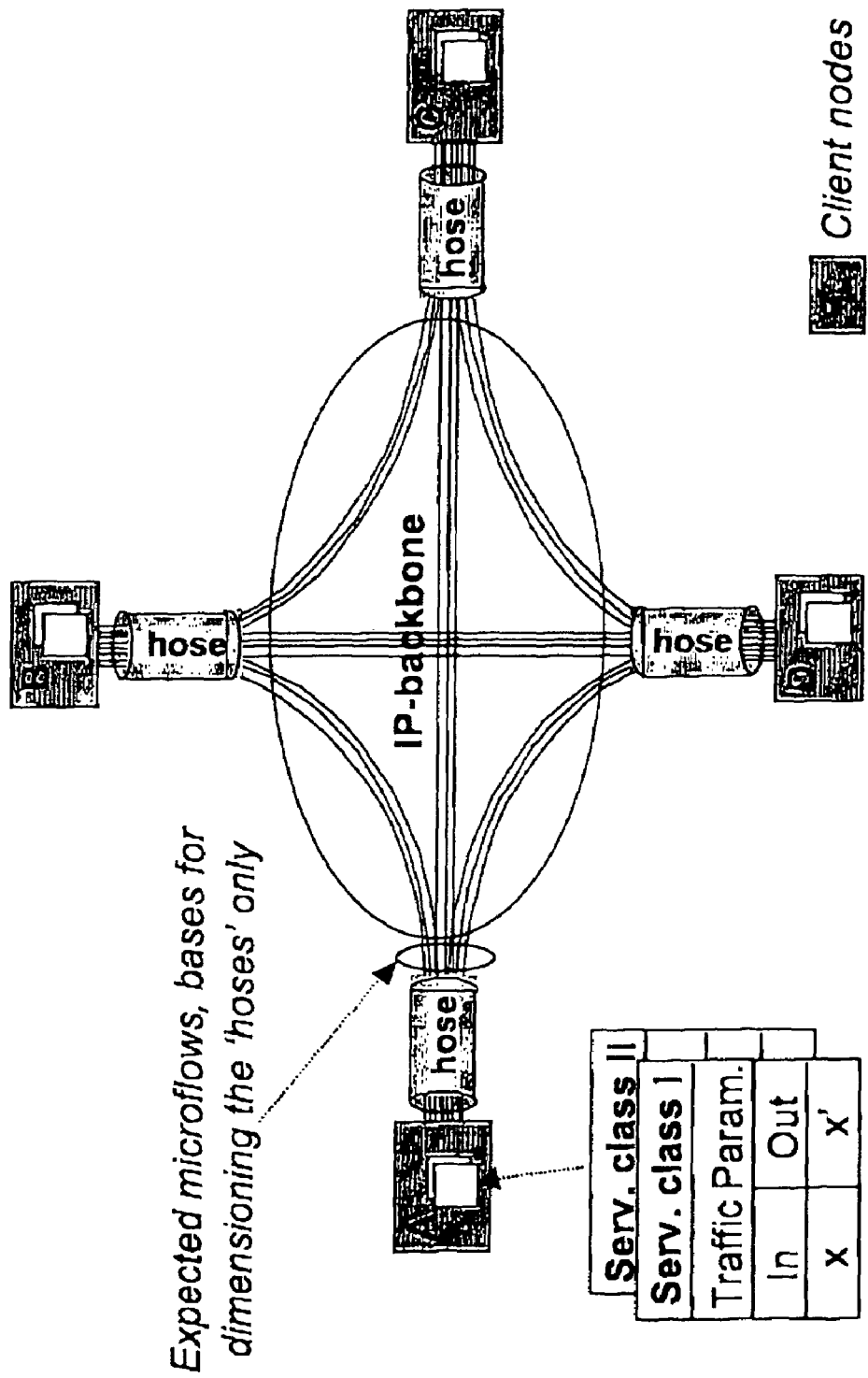
FIG. 2 is a schematic illustration of the traditional hose model.

One or more embodiments propose cluster-based provisioning, which in preferred implementations basically requires only minor modification to the network node design and preferably no new functionality in the routers.

A basic idea is to partition the network or at least part of the network into multi-node clusters or logical resource domains. Each such cluster hence includes at least two nodes. At the bottom level we have the network nodes, which are partitioned into basic clusters, which in turn may be divided into so-called super clusters if desired, and so forth for any number of higher levels. In a basic scenario, however, the hierarchical structure comprises network nodes partitioned into basic clusters, with optional super clusters.

The idea then is to perform cluster-based provisioning of the network, including at least the intra-cluster level and the inter-cluster level, with the configuration and application of one or more novel node-to-cluster traffic limitations on the inter-cluster level. This provisioning strategy applies well to large-scale networks, and the clustering makes it possible to define the node-to-cluster limitations and find an appropriate equilibrium between management complexity and overprovisioning.

The proposed service model allows us to configure service level definitions such as the SLAs in the VPN context—based on the concept of site/node clusters—in a more flexible way than the pure hose and trunk models. By defining a cluster as a set of network sites/nodes, we can differentiate between intra-cluster traffic and inter-cluster traffic in the service level definition (e.g. SLAs).

The selection of traffic provisioning model, also commonly referred to as bandwidth allocation or admission control model, is preferably based on the available information about the traffic distribution. As a simple rule of thumb, for "known" traffic, it may be beneficial to use a trunk or trunk-like model, while for "unknown" traffic a hose or hose-like model can be applied.

We can use trunk and hose models for intra-cluster provisioning. Trunk provisioning within a cluster normally means that the service level definitions (e.g. SLAs) include point-to-point limitations between each node pair in the cluster. Hose provisioning for intra-cluster traffic normally means that the total traffic to any other nodes/sites in the same cluster is limited at each node/site.

If external clusters are considered as if they were a single entity, then we could use so-called cluster-based trunk or hose modeling for inter-cluster provisioning. Trunk provisioning in the context of inter-cluster traffic may for example be applied such that the bandwidth for traffic aggregates to each cluster from each site/node and/or from each cluster to each site/node is being limited. Hose provisioning for inter-cluster provisioning may for example be applied to impose bandwidth limitations for the total inter-cluster traffic.

One of the benefits of cluster-based provisioning is that the service level definition such as the SLA can be adjusted to the traffic information available.

Figure 3:
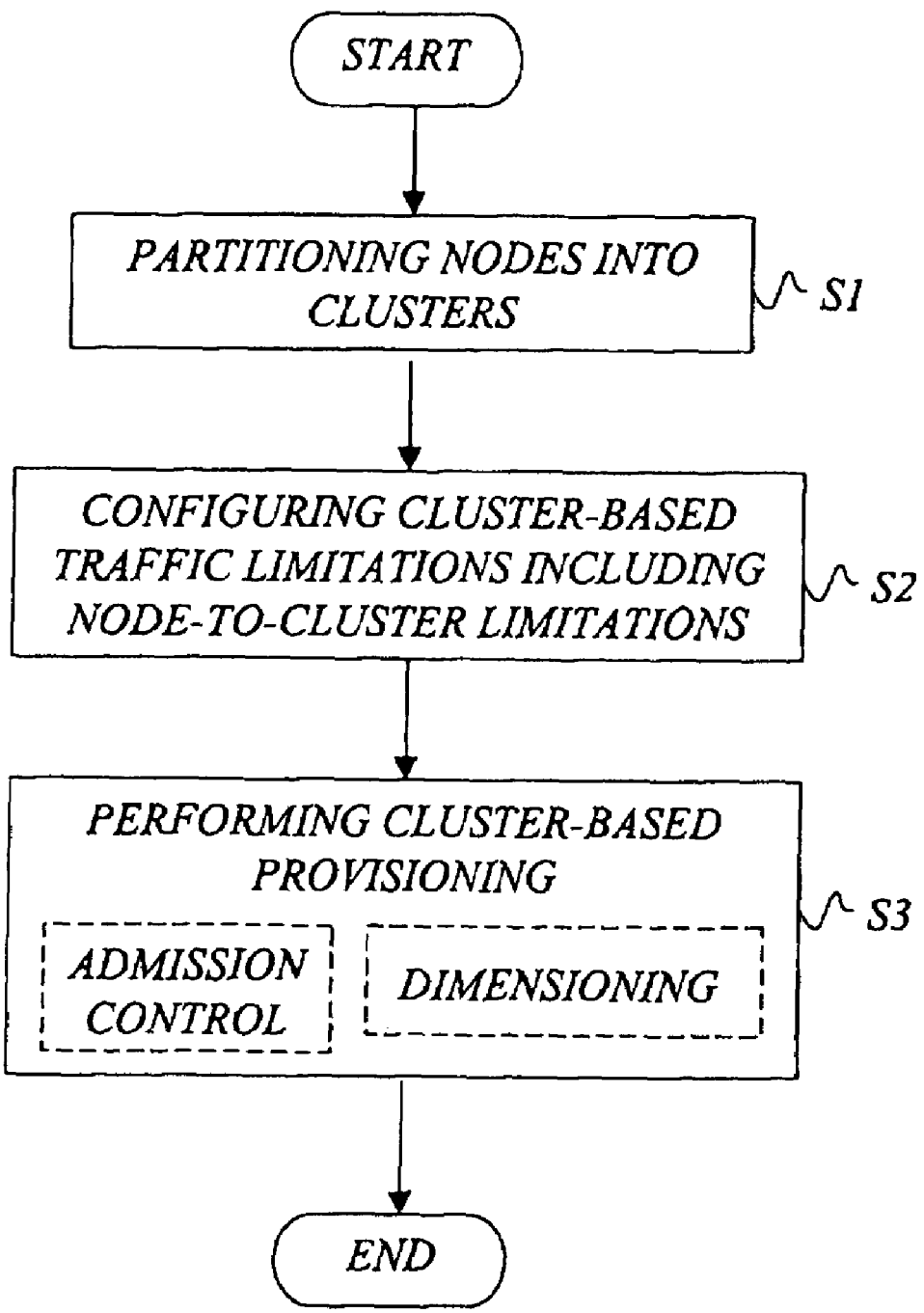
FIG. 3 is a schematic flow diagram of an exemplary provisioning method according to an embodiment of the invention.

As indicated in the schematic exemplary flow diagram of FIG. 3, the network is hence divided or partitioned into clusters (S1). In the next step (S2), traffic limitations including the novel node-to-cluster limitation or limitations are configured or defined. Based on the clustering and the associated traffic limitations, cluster-based provisioning of the network is performed (S3).

As mentioned above, the novel provisioning strategy typically scales well to large networks with regard to both bandwidth efficiency and configuration complexity. The provisioning strategy is also capable of finding a balance between sensitivity to changes in the structure of the traffic and robustness.

In each considered cluster, i.e. for intra-cluster traffic, hose, trunk or any other suitable traffic provisioning model may be used. This implies that a traffic provisioning model, sometimes referred to as an admission control model, can be selected independently for each cluster in the network if desired, thus providing a higher degree of flexibility compared to prior art network provisioning. This is normally performed in an initial configuration phase. Preferably, trunk or hose type characterization is defined within the scope of a cluster for intra-cluster traffic. Trunk-type characterization of intra-cluster traffic typically means that node-to-node traffic demands are given between each node pair in the cluster. Hose type characterization of intra-cluster traffic typically means that the total traffic demand from (to) the node to (from) any other node in the same cluster is specified.

Similarly, for the description of the inter-cluster traffic (the traffic between the clusters) a so-called cluster-based hose, trunk or other traffic provisioning model can be used in the network (or for each group of clusters), preferably depending on the available information about the traffic. This means that cluster-based trunk or hose type characterization may be applied to inter-cluster traffic. Trunk type characterization of inter-cluster traffic typically means that the total traffic from (to) a node to (from) another cluster is specified, while hose type characterization of inter-cluster traffic typically specifies the total inter-cluster traffic from (to) a given node. The overall provisioning strategy enables selection of an appropriate provisioning model for both intra-cluster provisioning and inter-cluster provisioning. Primarily, static traffic provisioning models are considered. For example, applying the concept of trunk and/or hose models to intra-cluster and inter-cluster traffic makes it possible to simplify traffic characterization and management without significantly degrading the bandwidth efficiency of the network.

Selecting between trunk and hose models for intra-cluster provisioning and between cluster-based trunk and hose models for inter-cluster provisioning gives the following basic combinations:

Intra-trunk, inter-trunk: In this case, the trunk model is used both inside the clusters and between the clusters.

Intra-hose, inter-trunk: Inside clusters, hose-based provisioning is used, and between clusters the cluster-based trunk model is used.

Intra-trunk, inter-hose: Inside clusters the trunk model is used, and for inter-cluster traffic the cluster-based hose model is used.

Intra-hose, inter-hose: In this case, hose-model-based provisioning is used both inside the clusters and between the clusters.

As previously mentioned, the novel provisioning strategy is preferably based on a logical division of the network into clusters, and a differentiation between inter-cluster and intra-cluster traffic.

Intra-cluster Traffic

Consider a given cluster $C_k$ and a node u sitting in that cluster. Then it is possible to give the intra-cluster traffic of this node, for example in the following two exemplary ways.

Intra-trunk: In this case we exactly limit the amount of traffic of u to/from each node in $C_k$.

Intra-hose: In this case we limit only the sum of the outgoing traffic of node u that goes to the other nodes in the same cluster, and the sum of the incoming traffic of node u that comes from the other nodes in the same cluster.

Inter-cluster Traffic

Consider again the node u sitting in cluster $C_k$. Here we can also introduce two exemplary ways for describing the traffic of u outside its cluster $C_k$, as follows.

Inter-trunk: In this case we preferably limit the amount of traffic of node u to/from each of the other clusters. Note, that this is generally a weaker description than the traditional point-to-point trunks.

Inter-hose: In this case for each node we limit only the sum of the outgoing traffic that goes to (any node in) any other cluster, and the sum of the incoming traffic that comes from (any node in) any other cluster than $C_k$.

There may be unity between the limitations for incoming traffic and outgoing traffic, which basically implies that we have a bi-directional limitation in practice.

Figure 4:
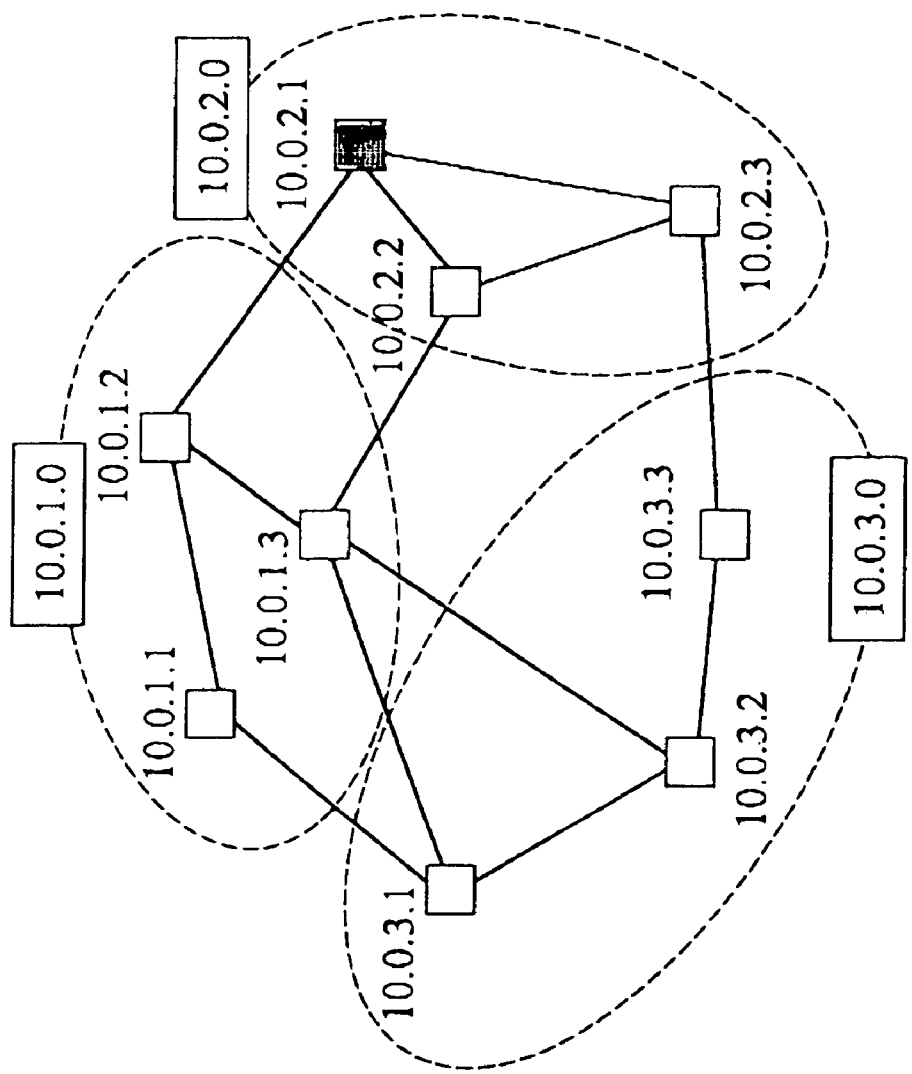
FIG. 4 is a schematic diagram showing a simple example of a network divided into clusters.

For the purpose of illustrating how blocks of a cluster-based service level definition (e.g. SLA) can be built, reference is now made to FIG. 4, which shows a simple example of a network divided into clusters. FIG. 4 shows an exemplary network, which is divided into three clusters, denoted 10.0.1.0, 10.0.2.0 and 10.0.3.0, respectively. The squares represent nodes such as backbone routers, and next to them the IP addresses are indicated. The tables below list exemplary intra-cluster and inter-cluster parameters, which can be used to specify a service level definition (e.g. SLA) in the specific node bearing the IP address 10.0.2.1 (indicated as a gray square in FIG. 4). Similar configurations are made in each concerned node.

| Target subnet | Out | In |
|---|---|---|
| Intra-cluster hose parameters | | |
| 10.0.2.0 | 220 | 210 |
| Intra-cluster trunk parameters | | |
| 10.0.2.2 | 120 | 110 |
| 10.0.2.3 | 100 | 110 |
| Inter-cluster hose parameters | | |
| 10.0.1.0 or 10.0.3.0 | 580 | 650 |
| Inter-cluster trunk parameters | | |
| 10.0.1.0 | 350 | 390 |
| 10.0.3.0 | 230 | 260 |

One of the benefits of cluster-based provisioning is that the required traffic information in the service level definition such as the SLA can be adjusted to the traffic information available. In a network with a number N of nodes, the number of bandwidth elements to be specified at a node is 2 for the traditional hose model and 2(N−1) for the traditional trunk model, assuming that there may be limitations for both in-bound and out-going traffic. Naturally, the number of limitations will be reduced by a factor 2 if a single entry is employed for both directions. In the novel cluster-based provisioning method, the number of bandwidth limitations varies between these two extremes. Given that there are M clusters (N>M>1) and each of them have the same size (N/M>1), the number of traffic limitations for intra-cluster traffic in a node is 2(N/M−1) for the trunk model and 2 for the hose model and the number of limitations for inter-cluster traffic is 2(M−1) for the trunk model and 2 for the hose model. Thus, for the four combinations of the intra- and inter-cluster provisioning, the total number of traffic limitations is as follows:

intra-trunk and inter-trunk: 2M+2N/M−4.
intra-hose and inter-trunk: 2M.
intra-trunk and inter-hose: 2N/M.
intra-hose and inter-hose: 4.

For the specific example of N=9 nodes and M=3 clusters, the size of each cluster is N/M=3 nodes, and the total number of traffic limitations is then equal to 8 for the intra-trunk and inter-trunk case, 6 for the intra-hose and inter-trunk case, 6 for the intra-trunk and inter-hose, and finally 4 for the intra-hose and inter-hose case.

If clusters are identified based on IP prefixes, the configuration entry for a bandwidth limitation normally includes a list of IP address prefixes and a bandwidth value. In such a case, the configuration complexity not only depends on the number of bandwidth values but also on the number of IP address prefixes. When a cluster is mapped to a single IP prefix, the configuration is clearly less cumbersome than in cases when a cluster is defined by a number of disjoint IP prefixes.

Definition of clusters may for example follow the rules below:

A cluster is preferably defined by a set of IP addresses. This set can be a single IP subnet or a set of IP subnets.

Naturally, other connectionless networks than IP-based networks can be used, with a corresponding cluster definition.

There could be multiple overlapping layers of clusters. In other words, one node may be part of multiple clusters.

A resource cluster is normally not restricted to be mapped to a single part of the network. It may contain multiple network parts. In most cases, a cluster includes nodes in proximity, but cases when a cluster includes disjoint network parts are not excluded.

Resources are preferably provisioned statically.

The cluster-based provisioning generally relates to resource allocation and/or network management, and preferably includes admission control and/or link capacity dimensioning.

The optimal selection of clusters and the corresponding dimensioning is a complex task, which makes the application of a support tool advantageous. For example, the selection/configuration of the clusters may be defined as an optimization task, in which the objective function has two components: a) minimizing the number of CAC entries/parameters and b) maximizing the bandwidth efficiency. Alternatively, the selection of clusters is preferably chosen such that bandwidth efficiency is better than a predefined value and the number of CAC configuration parameters is less than a predefined critical value. Note that we then normally assume that the achievable utilization increases if the number of configuration parameters increases. Note that not just the number of CAC entries/parameters but also the number of subnets in the definition of clusters affects management complexity.

For example, the number of configuration parameters can be minimized such that the resulting overprovisioning compared to pure trunk provisioning is below a certain threshold percentage (say 50%). Another alternative is to minimize the overprovisioning with a fixed number of configuration parameters (say 4 parameters in each node).

The tool then preferably includes an algorithm that performs this optimization task given that the requirements on cluster definitions, such as number of clusters, hierarchy levels, maximum number of CAC entries/parameters and minimum bandwidth efficiency are specified.

The cluster selection procedure may consider one or several selection criteria. Some examples of such criteria are listed below:

Traffic:
  Cluster selection on the basis of the traffic distribution between nodes.
IP-subnet address plan:
  Cluster selection on the basis of the IP-subnet address plan.
Topology:
  Cluster selection on the basis of the network topology.
Number of CAC entries:
  Cluster selection for minimizing the number of CAC entries/parameters in the nodes.
Bandwidth efficiency:
  Cluster selection for maximizing bandwidth efficiency.

The design tool preferably supports any combination of the above possibilities.

Dimensioning is preferably based on an off-line traffic-engineering tool to dimension the network according to the proposed provisioning model. As mentioned above, the cluster selection procedure finds the given number of clusters and splits the nodes between them, for example with respect to a well-defined optimization task such as minimizing the number of CAC entries/parameters. Alternatively, clusters are configured more or less directly in accordance with network topology or other similar factors.

In case of hose modeling, the dimensioning should preferably be based on global optimization taking into account all topology information and routing at the same time to provide the best bandwidth efficiency. In case of both hose and trunk model shortest path routing may be used.

In a preferred embodiment, the dimensioning algorithm calculates the required link capacities based on the determined inter-cluster and intra-cluster traffic limitations/configurations, and is preferably performed by a dimensioning tool that optimizes required traffic values by linear programming.

The dimensioning task based on intra- and inter-cluster provisioning models requires the novel node-to-cluster constraints/limitations for computing the required capacities. Typically, the network dimensioning does not assume the knowledge of the actual traffic matrix, but only assumes some side constraints on the traffic matrix and aims at designing a network that is able to carry any traffic that meets the given side constraints.

The side constraints typically express what we know in advance about the traffic or what we can measure. In addition to the traditional hose and trunk limitations, we may also limit the traffic between a node in a given cluster and an arbitrary set of nodes in another cluster or a set of other clusters. Similarly to the traditional case, two values are normally used for describing the traffic, one for the outgoing and another one for the incoming traffic.

In the following, a mere illustrative example of how the links capacities required by the cluster based bandwidth reservation method can be computed will be described. The proposed algorithm is an extension of the method proposed in [7].

We are given a network represented by a directed graph $G=(V, E)$. The set V of vertices denotes the set of nodes of the network, while the physical links are represented by the set E of edges. In this example, it is also assumed that we are given the actual routing between any pair of nodes. This would basically be done by giving a path $P_{uv}$ for each pair of nodes u and v.

However, we use a more general way to give the routing. For each pair of nodes u and v we introduce the flow function $r_{uv}: E \rightarrow [0, 1]$, where $r_{uv}(e)$ denotes the portion of the traffic between u and v that goes on the link e. In this way, we can handle the single path routing (by setting $r_{uv}(e)$ to 1 on the edges of the path between u and v and to 0 on the other edges) and the shared routing as well. Once the routing is given, a given traffic matrix determines the load on the links. If $t_{uv}$ denotes the amount of the traffic from u to v then the traffic of a certain link e is:

$$tr(e) = \sum_{u,v \in V} r_{uv}(e) t_{uv}. \tag{1}$$

The suggested approach does not assume knowledge of the actual traffic matrix, but only assumes a set of side constraints, and the network is preferably dimensioned in such a way that the capacity will be sufficient for any traffic matrix that meets the side constraints. Preferably, cluster-based side constraints are employed to describe the real traffic in a more exact manner to avoid the unnecessary overdimensioning.

The side constraints can be classified as follows.

Trunk Parameter. Here we know the maximum amount of the traffic from a certain given node u to another one v. We denote the maximal value with $T_{u\to v}$. This constraint can be formalized as follows.

$$t_{uv} \leq T_{u\to v}. \quad (2)$$

Hose Parameter. In case of the traditional hose traffic description we limit the traffic originated from and directed to a certain node u, denoted by $T_{u\to v}$ and $T_{v\to u}$, respectively. In mathematical formulae it means:

$$\sum_{v\in V} t_{uv} \leq T_{u\to V} \quad (3a)$$

and $$\sum_{v\in V} t_{vu} \leq T_{V\to u} \quad (3b)$$

Cluster Based Parameter. Here we limit the traffic between a node u and an arbitrary set S of nodes (regarded as one or more other clusters). Similarly to the previous case, two values used for describing the traffic, one for the outgoing and another one for the incoming traffic, $T_{u\to S}$ and $T_{S\to u}$, respectively. In mathematical formulae:

$$\sum_{v\in S} t_{uv} \leq T_{u\to S} \quad (4a)$$

and $$\sum_{v\in S} t_{vu} \leq T_{S\to u} \quad (4b)$$

Note that all the above constraints are linear making it possible to solve efficiently the optimization problems that use these constraints. Our capacity reservation method is based on a clustering of the nodes. Thus, the set of the nodes is preferably partitioned into k disjoint subsets called clusters, i.e. $V=C_1\cup C_2\cup \ldots \cup C_k$, and $C_i\cap C_j=0$ whenever $i\neq j$.

The idea is to differentiate between the intra-cluster and the inter-cluster traffic. As previously outlined, in both cases there are two natural possibilities.

Intra-Cluster Traffic

Consider a given cluster $C_k$ and a node u sitting in that cluster. Then we can give the intra-cluster traffic of this node in the following two exemplary ways.

Intra-trunk: In this case we preferably limit the amount of traffic of u to/from each node in $C_k$, by using the parameter $T_{u\to v}$ for each $v\in C_k$, $u\neq v$.

Intra-hose: In this case we limit only the sum of the outgoing traffic of node u that goes to the other nodes in the same cluster, and the sum of the incoming traffic of node u that comes from the other nodes in the same cluster, by using the parameters $T_{u\to C_k}$ and $T_{C_k\to u}$.

Inter-Cluster Traffic

Consider again the node u sitting in cluster $C_k$. Here we can also introduce two exemplary ways for describing the traffic of u outside its cluster $C_k$, as follows.

Inter-trunk: In this case, we limit the amount of traffic of node u to each of a first set of other clusters and the amount of traffic of node u from each of a second set of other clusters, e.g. by using the parameters $T_{u\to C_j}$ and $T_{C_j\to u}$ for each $j\neq k$. Note that is generally a weaker description than the traditional point-to-point trunks. The first set of other clusters and the second set of other clusters are typically equal to each other, but may differ from each other.

Inter-hose: In this case, for each node u we limit only the sum of the outgoing traffic that goes to (any node in) any other cluster, and the sum of the incoming traffic that comes from (any node in) any other cluster than $C_k$, by using the parameters $T_{u\to V\setminus Ck}$ and $T_{V\setminus Ck\to u}$, respectively.

The inter-trunk limitations normally correspond to what is called a cluster-based trunk model, and the inter-hose limitations normally correspond to what is called a cluster-based hose model.

As we mentioned, our aim is to dimension the network in such a way that it is able to carry any possible traffic scenario that meets our preconditions. Thus we may dimension each individual link considering the worst-case scenario. To compute this maximum traffic of a link e, the traffic matrix $t_{uv}$ that meets our preconditions and maximizes the traffic value (1) should be found. As the objective function (1) and the constraints (2), (3), and (4) are linear functions, the value of (1) can be maximized efficiently by any linear programming method, e.g. the simple lp_solve software package [18]. Of course we have to repeat this process for each edge $e\in E$ in order to get the total necessary bandwidth.

Note, that $r_{uv}(e)$ is zero for most of the u,v pairs, so the size of the real linear program to solve can be largely reduced by omitting each variable $t_{uv}$ whose corresponding route does not use the edge e. It is also possible to omit the constraints that do not affect any remaining variables.

As an example, let us see the linear program when we use the intra-trunk/inter-hose traffic description.

$$\max \sum_{u,v\in V} r_{uv}(e) t_{uv} \quad (5a)$$

subject to $$t_{uv} \in \Re \qquad \forall u, v \in V, u\neq v \quad (5b)$$

$$t_{uv} \geq 0 \qquad \forall u, v \in V, u\neq v \quad (5c)$$

$$t_{uv} \leq T_{u\to v} \qquad \forall k, \forall u, v \in C_k, u\neq v \quad (5d)$$

$$\sum_{v\in V/Ck} t_{uv} \leq T_{u\to V/Ck} \qquad \forall k, \forall u \in C_k \quad (5e)$$

$$\sum_{v\in V/Ck} t_{vu} \leq T_{V/Ck\to u} \qquad \forall k, \forall u \in C_k. \quad (5f)$$

It has been shown that the choice of routing may have a significant effect on the bandwidth efficiency, both in trunk and hose dimensioning. For pure trunk dimensioning the best choice is when the traffic is routed via the least hop path, while tree routing (i.e. when the traffic is routed via a spanning tree) gives the best performance for hose dimensioning. In the cluster-based provisioning, the clustering divides the network into two levels, which motivates the investigation of the effect of multi-level routing solutions. Applying for example shortest-path and tree routing, gives the following additional routing scenarios:

Shortest path intra-cluster/Shortest path inter-cluster.
Shortest path intra-cluster/Tree inter-cluster.
Tree intra-cluster/Shortest path inter-cluster.
Tree intra-cluster/Tree inter-cluster.

Experiments and simulations have shown that bandwidth efficiency can be increased if routing is adjusted to the selected provisioning method. Therefore, routing optimization in connection with calculation and configuration of explicit routes may also be a function of a design tool. More details on routing optimization will be given later in connection with the VPN context.

Figure 5:
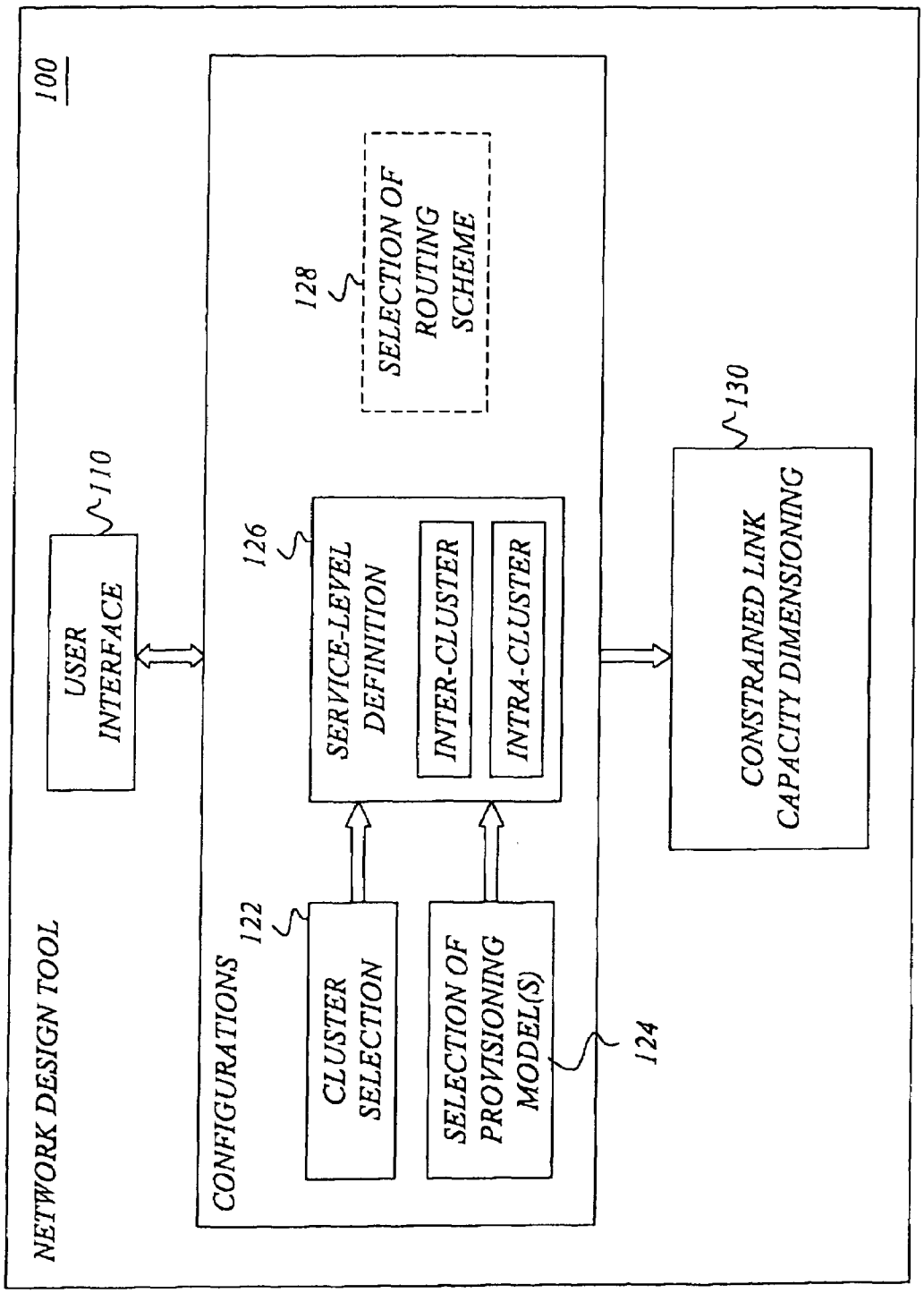
FIG. 5 is a schematic block diagram of network design tool according to an exemplary embodiment of the invention.

FIG. 5 is a schematic block diagram of network design tool according to an exemplary embodiment of the invention. The exemplary network design tool 100 is preferably an interactive design or support tool, and basically comprises a user interface 110, a configurations module 120 and preferably also a dimensioning module 130. The configurations module 120 typically includes a cluster selection unit 122, a provisioning model selection unit 124, a service level definition unit 126 and an optional routing scheme selection unit 128. The operator may enter input information and/or configuration settings via the user interface 110, and information may also be input from the network, including the edge routers. Cluster selection is performed by cluster selection unit 122 in response to the relevant input information, for example as described above. Suitable provisioning model(s) such as (cluster-based) hose and/or trunk models are configured in selection unit 124. Both inter-cluster and intra-cluster service level definitions are typically configured (input) in the service level definition unit 126. In the optional routing scheme selector 128, routing may be adjusted to the selected provisioning model(s) to increase bandwidth efficiency. The design tool may then include functionality for routing optimization in connection with calculation and configuration of explicit routes. Based on the configuration settings and the cluster-based service level definition, the dimensioning module 130 preferably performs constrained link capacity dimensioning. This typically means that the links are dimensioned based at least partly on one or more node-to-cluster traffic limitations on the inter-cluster level, and preferably also based on one or more supplementary traffic limitations on the intra-cluster level. As mentioned above, the dimensioning module may be configured to optimize required traffic values by linear programming. The design tool functionality is typically implemented in software and executed in a network management computer, but there is nothing that prevents the design tool from being implemented in hardware or firmware.

Figure 6:
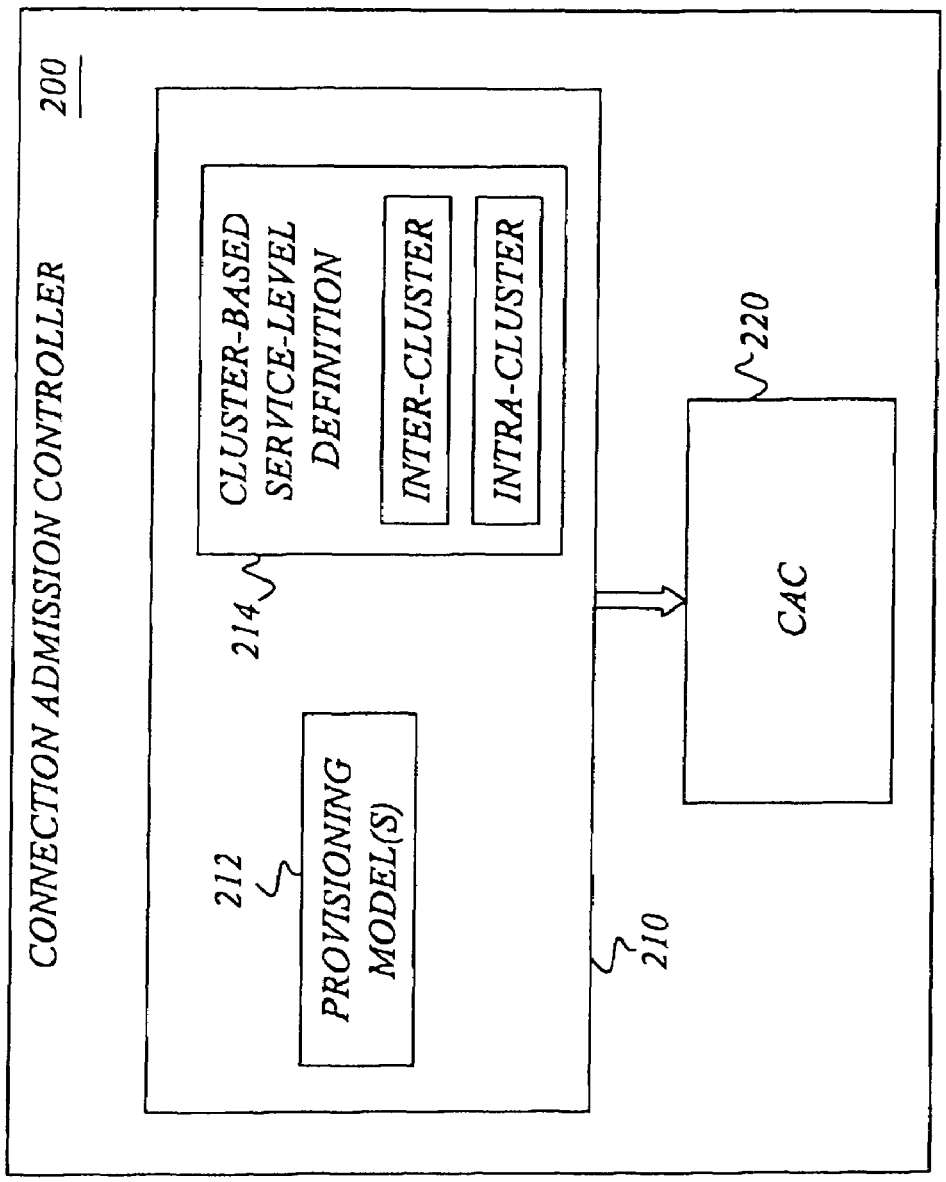
FIG. 6 is a schematic simplified block diagram of an admission controller according to an exemplary embodiment of the invention.

FIG. 6 is a schematic simplified block diagram of an admission controller according to an exemplary embodiment of the invention. The exemplary admission controller 200 includes a configurations module 210 and an admission control function 220. The configurations module includes means 212 for defining suitable provisioning model(s), and a cluster-based service level definition module 214. The cluster definition is normally done manually node by node or centrally by some remote mechanism. The admission control function is assumed to reflect the structure of the service level definitions, such as the SLAs in the VPN context. In other words, the admission control function normally includes or operates based on the same bandwidth limitations for the same traffic aggregates as the part of the service level definition that is related to real-time traffic. For admission control, a new connection request is processed by identifying the appropriate bandwidth limitation, and then applying the bandwidth limitation to determine whether the connection can be accepted or should be rejected. The CAC functionality is normally arranged in each concerned edge node or edge router.

In the following, the invention will be described with reference to an exemplary implementation for so-called media gateway nodes in a mobile core transport network. It should however be understood that the invention is not limited thereto, but rather applicable to general communication networks including fixed and mobile networks, VPN networks as well as other types of networks.

Exemplary Implementation in the Context of a Mobile Core Network

In an exemplary embodiment of the invention, which is especially adapted for a mobile core network, an integrated combination of trunk, hose and MBAC-based network provisioning is exploited. The admission control is preferably divided in:
   Admission during normal conditions and single fault events: Static provisioning with provisioning of clusters.
   Unexpected congestion in multiple fault conditions: Preferably, MBAC is employed in order to block calls if measured loss ratio exceeds the configured level.

Static Provisioning of Clusters

In the same way as previously described, the core network with its media gateway nodes (MGWs) is divided into clusters or logical resource domains to limit the number of configuration parameters in the MGWs in a large-scale topology. The configuration of the admission control preferably comprises entries of the following format:
<cluster definition> <bandwidth limit(s)> where the cluster definition may be a list of IP subnets, and a cluster is defined as a set of MGWs.

Example Network

Figure 7:
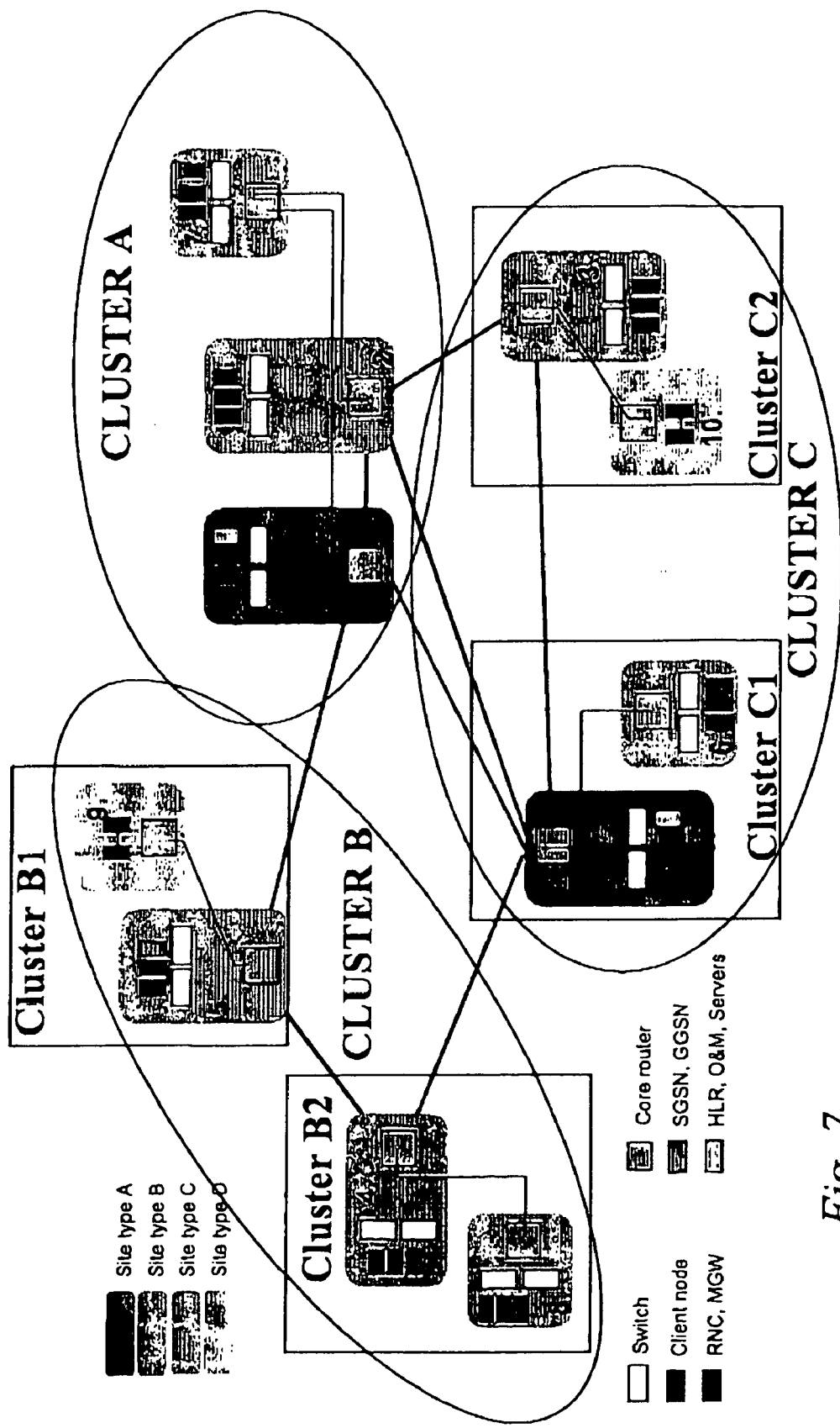
FIG. 7 illustrates an exemplary cluster definition for an illustrative core transport network.

A possible cluster definition for an illustrative core transport network is shown in FIG. 7. It should be understood that more than two levels, i.e. the underlying nodes and the clusters, can be included in the logical network representation. In the example of FIG. 7, we have optional super-clusters indicated by ellipses. Note that sites can also be considered as clusters.

A possible set of entries of admission control in MGW 6 (in Site 6) is as follows:

Inter-Cluster Trunk/Intra-Cluster Trunk Model
   Inter:
   <Cluster A> <BW>
   <Cluster B 1> <BW>
   <Cluster B2> <BW>
   Intra:
   <Site Router 0> <BW>
   <Site Router 3> <BW>
   <Site Router 10> <BW>
   In this example, Cluster C should be dimensioned according to trunk model. The traffic between cluster A, B1, B2 and C is also dimensioned according to the trunk model.
   If the bandwidth efficiency of hose dimensioning is sufficient for the traffic of Cluster C then the above list can be replaced by:

Inter-Cluster Trunk/Intra-Cluster Hose Model
   Inter:
   <Cluster A> <BW>
   <Cluster B1> <BW>
   <Cluster B2> <BW>
   Intra:
   <Cluster C> <BW>
   Examples of other provisioning models include:

Inter-Cluster Hose/Intra-Cluster Trunk Model
   Inter:
   <Cluster A, B1, B2> <BW> (common hose parameters)
   Intra:
   <Site Router 0> <BW>
   <Site Router 3> <BW>
   <Site Router 10> <BW>

Inter-Cluster Hose/Intra-Cluster Hose Model
  Inter:
    <Cluster A, B1, B2> <BW>
  Intra:
    <Cluster C> <BW>

Many other combinations of clusters could be configured in the MGWs, which inherently imply different dimensioning of the links.

Requirements on the MGWs

The basic criterion for using the above network model is to distinguish clusters in the admission control of MGWs. This differentiation can for example be done using IP-subnet addresses, or based on any other suitable criteria.

The addressing plan of the core network can be such that it is impossible to define a single IP subnet for a whole cluster. Therefore, the MGWs should allow the configuration of multiple IP subnets for a single CAC entry.

To use static admission control, bandwidth limits should be configured for each CAC entry.

If desired, admission control could take into account packet drop statistics and bandwidth limit for the configured clusters in the MGW. Therefore, drop statistics may still be aggregated for the configured clusters in the CAC. A connection can be admitted if the measured loss ratio is smaller than the configured limit AND if the bandwidth of admitted connections does not exceed the configured limit.

From the viewpoint of fault tolerance three redundancy solutions may be considered:
  1. No redundancy
  2. Single link failure
  3. Single node failure Results on an Exemplary Network In the following, a brief performance analysis of the proposed provisioning model is presented in case of a realistic mobile core network where the traffic parameters are known.

Figure 8:
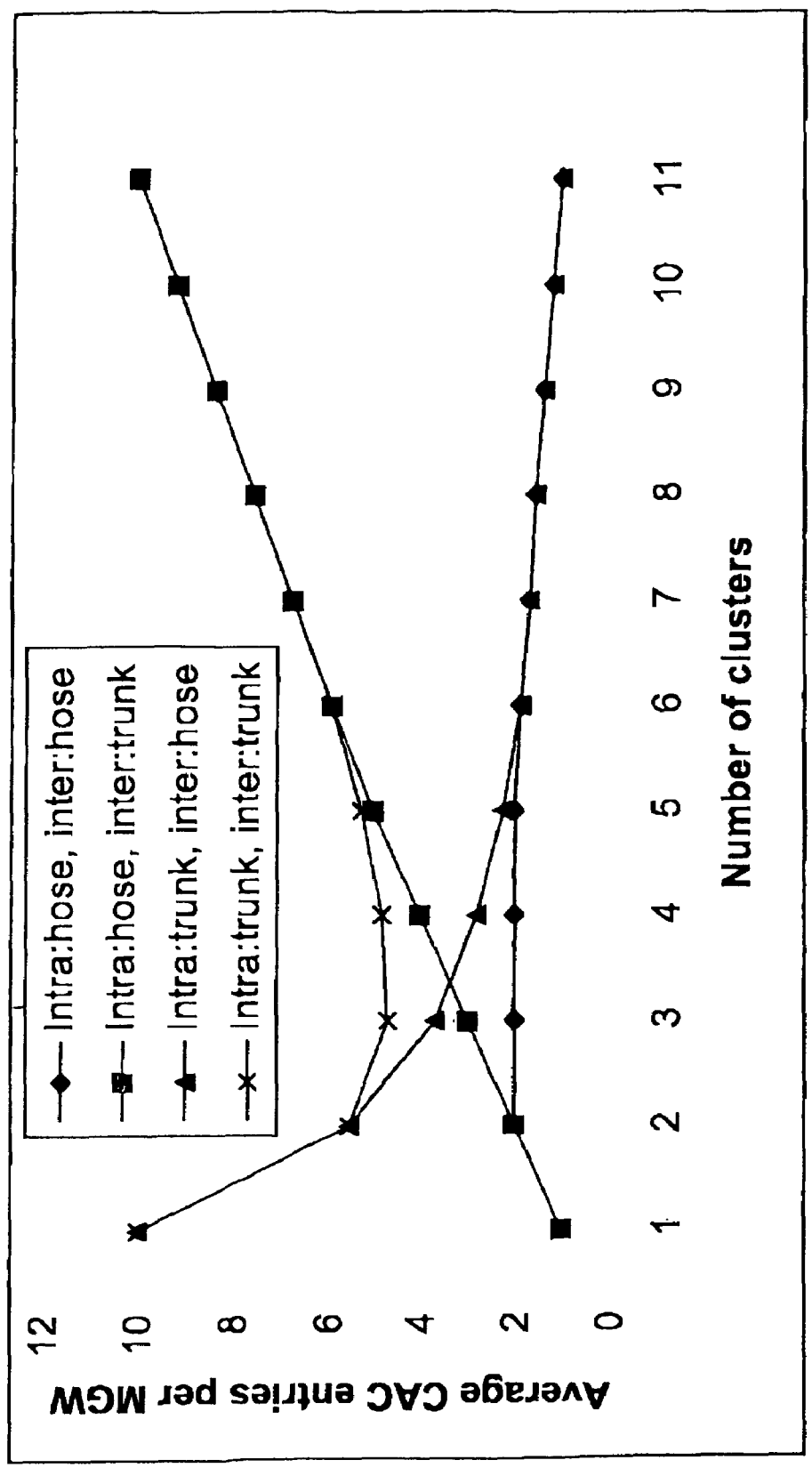
FIG. 8 illustrates the number of average CAC entries as a function of number of clusters for an exemplary network.

From the viewpoint of the MGWs it is very important how many CAC entries/parameters should be configured in case of the different provisioning models and cluster numbers. In FIG. 8, the number of average CAC entries can be seen as a function of number of clusters.

On the basis of FIG. 8 it can be noted that three clusters provide the lowest average number of CAC entries per MGW. From the viewpoint of CAC entries, the most advantageous provisioning method is the intra-hose, inter-hose, but the intra-hose and inter-trunk is also very suitable, especially in the interval of 2-4 clusters in the network.

Figure 9:
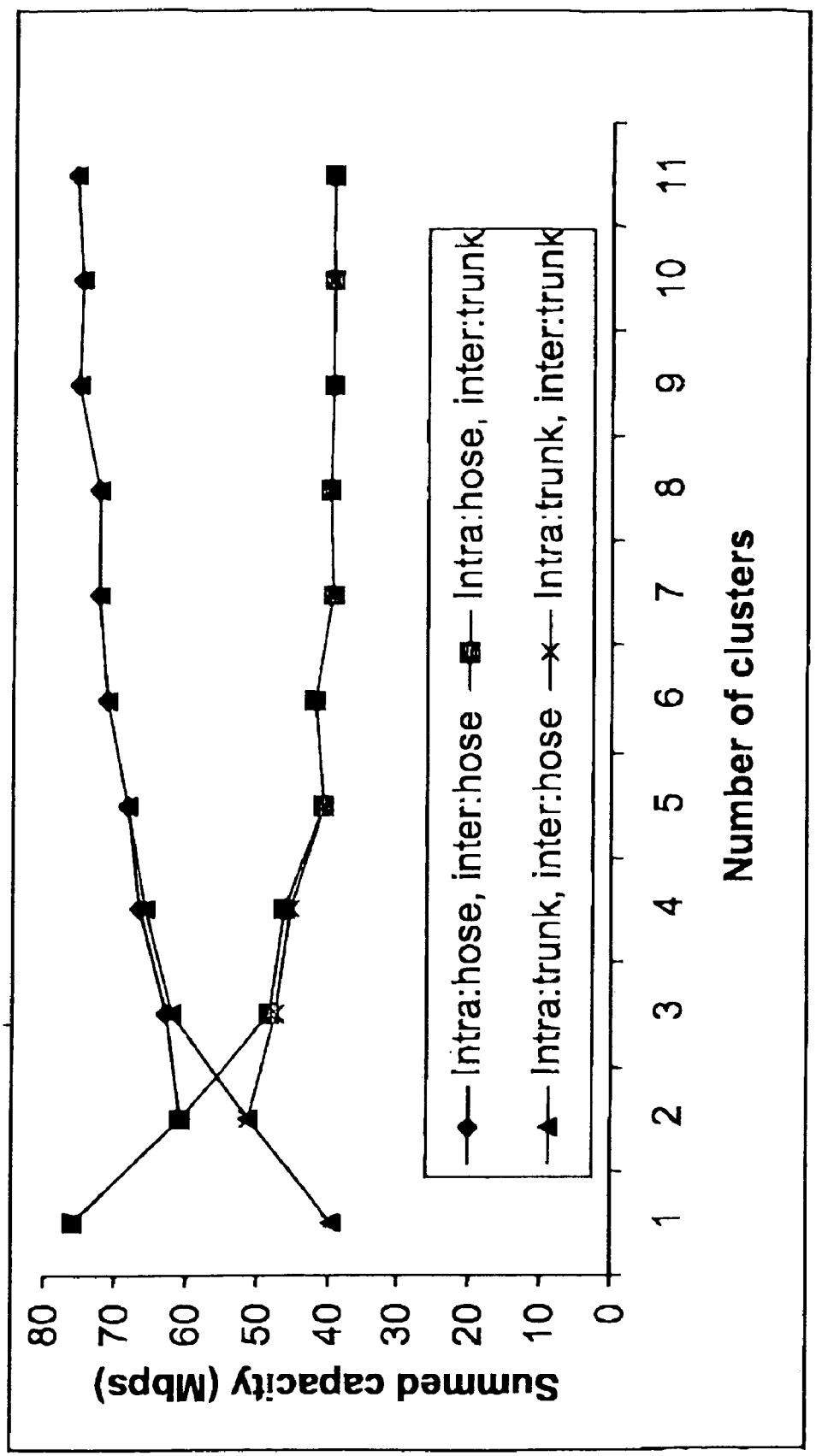
FIG. 9 illustrates a comparison of the proposed provisioning models on the basis of the summed capacity for an exemplary network.

In FIG. 9, the proposed provisioning models are compared on the basis of the summed capacity.

From the viewpoint of required bandwidth the intra-trunk, inter-trunk model is the best, but the intra-hose, inter trunk-model also provides very attractive results. It is important to note that from the viewpoint of summed capacity the suitable number of clusters is three, if the target-overprovisioning factor is around 20%.

Based on the results of FIGS. 8 and 9, it may be concluded that with regard to a trade-off between the number of CAC entries and bandwidth efficiency, the intra-hose, inter-trunk model provides the best overall performance.

The impact of different routing strategies has been investigated. In this regard, the intra-hose, inter-trunk provisioning model may advantageously be combined with tree routing on the intra-cluster level and shortest path routing on the inter-cluster level, as will be appreciated from the simulations on routing optimization to be described later on.

Protection for link and/or node failures may also be provided, e.g. by re-routing or by using back-up paths. The impact of link and node protection has also been investigated.

Figure 10:
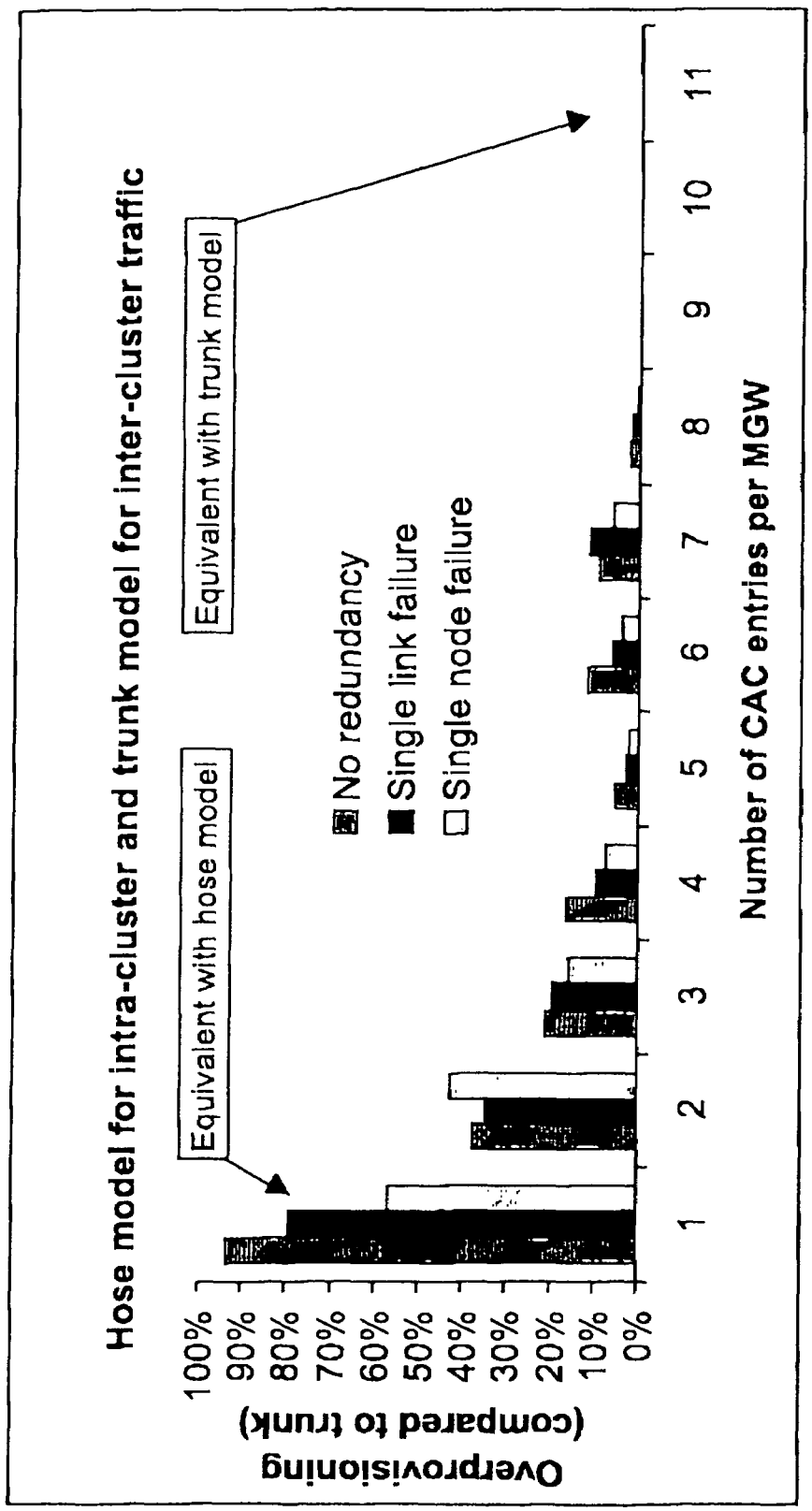
FIG. 10 illustrates the overprovisioning when intra-hose, inter-trunk provisioning is used without protection, as well as with link and node protection, for an exemplary network.

FIG. 10 shows the overprovisioning when intra-hose, inter-trunk provisioning is used without protection, as well as with link and node protection.

A complementary description for the specific context of a Virtual Private Network (VPN) will now be described.

Exemplary Implementation in the VPN Context

In general, Virtual Private Networks (VPNs) play an important role in the enterprise business mainly because they provide great flexibility for customers in operating their networks. Solutions are also developed to attract customers with limited resources and infrastructure for network management. Offering simple and flexible bandwidth management models for customers is also considered as an important goal of VPN providers. Simplicity for the customer, however, often means increased management effort and less efficient network utilization for the network operator. On the other hand, reduced network efficiency and more management tasks, increase the operational costs and yield more expensive services.

As previously mentioned, hose and trunk resource provisioning models are two examples of resolutions of the conflict between efficient backbone operation and flexible bandwidth model. In the customer-pipe model, which is also known as trunk model, point-to-point traffic demands are specified between each VPN site pair allowing the operator to independently reserve bandwidth between each pair of sites. This model enables the VPN provider to utilize the network in the best way, since the known traffic matrix determines exactly the required link capacities if routing information is also known. The critical part of this model is that the communication pattern between the end-points is very difficult to estimate. Customers may be unable to exactly predict and define traffic loads between the sites, which makes it difficult to specify the complete site-to-site traffic matrix for the Service Level Agreement (SLA). Even if the estimation of the traffic matrix is supported by tools, it is hard to specify the proper bandwidth requirement due to traffic fluctuations.

Another drawback of the customer-pipe model is the complexity of the management of trunks. Resource reservations needs to be configured in each source node to each sink node, including policing configuration for the provider and shaping/admission control configuration for the customer. If a full mesh logical network is assumed between the customer's sites then the sum of parameters to be configured is proportional to the square of the number of nodes in the VPN. Therefore, configuration complexity may become the main drawback of the trunk model in case of large-scale networks.

The hose model takes a more pragmatic approach by requiring only the specification of the aggregated incoming and the aggregated outgoing traffic volumes at each node. These traffic parameters can be specified either according to the physical capacity of the link to the provider's network or based on measurements. Whichever approach is used, the estimation of traffic demand is easier and more precise compared to the customer-pipe model. Configuring hose parameters requires much less effort from both customers and providers than configuration of trunks. Only one incoming and one outgoing hose parameter should be configured in each source node. Thus, the number of configuration parameters is proportional to the number of VPN sites. These properties make the hose model definitely attractive for customers. On the other hand, the application of the hose model has a great impact on resource provisioning in the VPN backbone. Network dimensioning based on partial information on the traffic demands yields overdimensioning compared to trunk model, if the same service performance is required in both cases. Furthermore, the required overprovisioning increases significantly with the size of the network, regarding both the number of nodes and the number of links.

Hence, it can be seen that the conventional resource provisioning methods do not scale well to large VPN networks.

By dividing the network into multi-node clusters, performing cluster-based provisioning of the network on at least two levels and using cluster-based traffic description we can find an appropriate equilibrium between management complexity and overprovisioning in the same or similar manner as previously described. Such a provisioning strategy applies well to large-scale networks, and the clustering makes it possible to characterize the VPN traffic by point-to-cluster demands, instead of simply the point-to-point demands of the traditional trunk model and the point-to-everywhere demands of the traditional hose model. These new so-called node-to-cluster traffic limitations are typically applied on the inter-cluster level, and serve as the key to improved performance in the VPN networks.

For example, consider a QoS-enabled VPN with static service level agreement between the VPN provider and customer. The VPN provider typically has a policing function that controls the ingress/egress traffic in accordance with the SLA. The VPN customer may also have a shaper at the network edges for the same purpose. Furthermore, the customer may operate an admission control function for real-time services to avoid QoS degradation due to exceeding the traffic limitations specified in the SLA. The admission control function is also assumed to reflect the structure of the SLA, i.e. it includes the same bandwidth limitations for the same traffic aggregates as the part of the SLA that is related to real-time traffic.

The management of a VPN architecture generally includes tasks for the VPN customer as well as for the VPN provider. It is often up to the VPN customer to measure traffic in the network and renegotiate SLAs when traffic exceeds a given limit. Configuring the admission control and shaping in accordance with the SLA is also usually the task of the VPN customer. On the other hand, it is normally the responsibility of the VPN provider to ensure that the bandwidth specified in the SLA is always available in the backbone. In case of re-negotiation, the provider has to check if he can cope with the increased traffic or some of the links need to be upgraded. It is also up to the provider to configure the policing function according to the SLAs.

The main interest of the VPN providers is to facilitate the tasks of their customers by offering simple SLAs. However, under-specified traffic descriptions yield overprovisioning which makes the offerings more expensive. Therefore, a reasonable balance between VPN management complexity and overprovisioning in the backbone is required.

The proposed service model allows us to configure the SLAs in the VPN context—based on the concept of site clusters—in a more flexible way than the pure hose and trunk models. By defining a cluster as a set of VPN sites/nodes, we can differentiate between intra-cluster provisioning and inter-cluster provisioning in the SLAs. This allows the VPN operator to customize the service offering to the requirements of the specific VPN customer. Thus, traffic characterization and management could be simplified without significantly degrading the bandwidth efficiency of the VPN backbone.

The first task, which is affected by the cluster-based provisioning is traffic measurement and SLA re-negotiation. The larger aggregates that are the subject of the SLA, the easier to identify that the SLA needs to be renegotiated. As indicated previously, one of the benefits of cluster-based provisioning is that the required traffic information in the SLA can be adjusted to the traffic information available for the customer.

The other mentioned task for the VPN customer is the configuration of admission control for real-time traffic or shaping for best-effort traffic, shortly management complexity. In this context, another advantage of cluster-based provisioning is its scalable management complexity.

The form of SLA considerably affects the management complexity. An SLA for cluster-based provisioning may include point-to-point elements, point-to-single-cluster elements and point-to-multi-cluster elements. In other words, bandwidth limitations may be configured for a set of sites, which may be a single site, a cluster or even multiple clusters. As shaping and admission control at the customer often identify clusters based on the IP prefixes, the configuration entry for a bandwidth limitation in any of these functions typically includes a list of IP address prefixes and one or more bandwidth values. Thus, the configuration complexity not only depends on the number of bandwidth values but may also depend on the number of IP address prefixes, as already indicated before. When a cluster is mapped to a single IP prefix then the configuration is clearly less cumbersome than in the case when it includes a number of disjoint prefixes. Therefore, if clusters are already defined at the start-up of the VPN then the addressing plan should preferably take them into account.

VPNs are normally implemented with some kind of tunneling technique, which usually also assumes that the IP addressing of the VPN is independent of the addressing of the IP backbone. Shaping and admission control are assumed to be placed at the customer, so that they are based on the addressing of the VPN. The independence of backbone and VPN addresses makes it possible to define an optimal addressing plan tailored to the actual VPN independently of other VPNs. Thus, cluster definitions can be local to the VPN.

If IP addressing is fixed in the VPN, then cluster definitions should preferably consider the addressing plan. For example, it may be a better choice to require slightly more over-provisioning in the backbone to allow one-to-one mapping between IP address prefixes and clusters than defining clusters based on physical topology from a number of disjoint IP prefixes. Anyhow, it is clear that there is a trade-off between bandwidth efficiency, number of SLA parameters to be estimated and configuration complexity.

Returning to the responsibilities of the VPN provider. Besides the configuration of policing, whose management complexity is similar to that of shaping and admission control at the customer, the VPN provider has to check if the backbone links can cope with the traffic limited by ingress policers. In this respect, the cluster-based method is somewhat similar to hose provisioning in that more complex calculations are needed to fulfill this task due to the current lack of a resource reservation protocol supporting hose-based and cluster-based reservations. Checking network resources against trunk-based resource requests is normally easier since all resource reservation protocols, such as aggregate RSVP or future NSIS protocol for routed IP VPNs and RSVP-TE for MPLS VPNs, support trunk reservations. The provider may also manage the task of optimizing routing, as previously described, so that the actually used network resources are minimized. Thus, it is desirable for the VPN provider to try to solve the optimization task with requirements or restrictions on minimum bandwidth efficiency, maximum number of bandwidth limitations and maximum number of IP prefixes. Preferably, the basic link capacity algorithm described above is implemented in a network design tool by the VPN provider for calculating the necessary link capacities for traffic given by the selected cluster-based description, making it possible to design congestion-free networks.

The applicability and limitations of the proposed methodology and the effect of different routing strategies and fault tolerance have been examined by simulating several test scenarios for VPN networks. In the following, we will briefly present a limited but yet illustrative selection of these simulations.

Performance Study

In the simulations, the AT&T reference backbone network with its publicly available topology was used as a basis for the performance analysis. We mainly considered only the part of the network made up of the Gateway nodes, backbone nodes connected with N OC48 and N OC192 links, to obtain our test network comprising 25 sites connected with 44 links.

First, we compare the proposed cluster based provisioning for the different variants without considering routing optimization and protection methods. We then study how routing optimization can be used to improve the bandwidth efficiency. Finally, we mention the effect of protection methods on the results.

Figure 11:
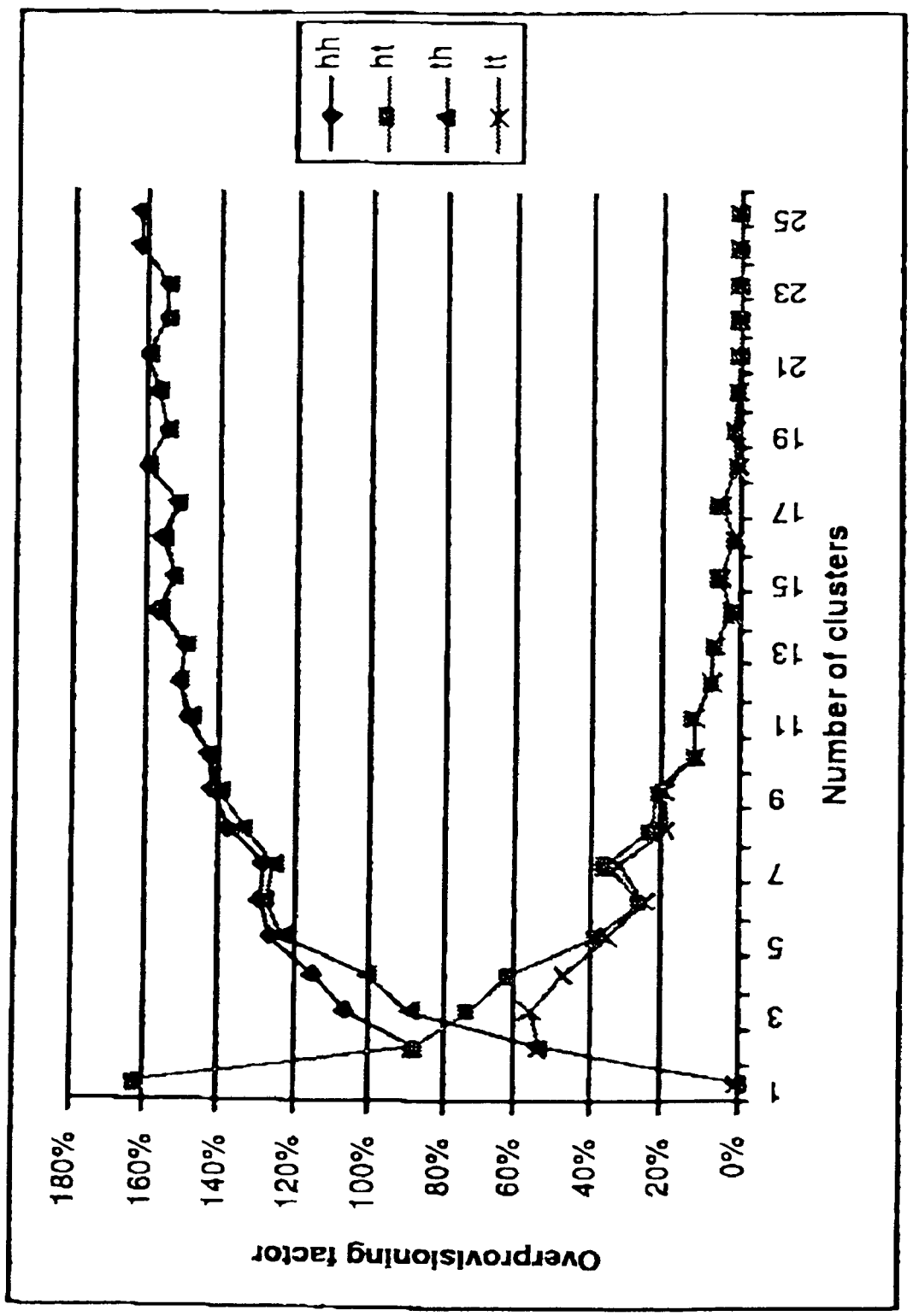
FIG. 11 illustrates the overprovisioning factor as a function of the number of clusters with different dimensioning variants, for a large backbone reference network.

FIG. 11 illustrates the overprovisioning factor as a function of the number of clusters with different dimensioning variants. The comparison of the provisioning variants is here based on shortest path routing and assumes that no protection methods are applied. The capacity of required links and the management complexity are the key measures characterizing the performance of the methods, so we calculate them for the evaluation. The studied network scenario is based on the 25 node AT&T network, as mentioned, and a pre-calculated traffic matrix. We performed dimensioning for each possible number of clusters (from 1 to 25). From now on we use the following names for the cluster-based provisioning variants for short reference:

'tt': Trunk for intra-cluster and inter-cluster traffic.
'th': Trunk for intra-cluster traffic and hose for inter-cluster traffic.
'ht': Hose for intra-cluster traffic and trunk for inter-cluster traffic.
'hh': Hose for intra-cluster and inter-cluster traffic.

FIG. 11 shows the overprovisioning factor compared to the trunk model, i.e. the relative difference between the capacity need for the evaluated provisioning variant and the pure trunk model.

Figure 12:
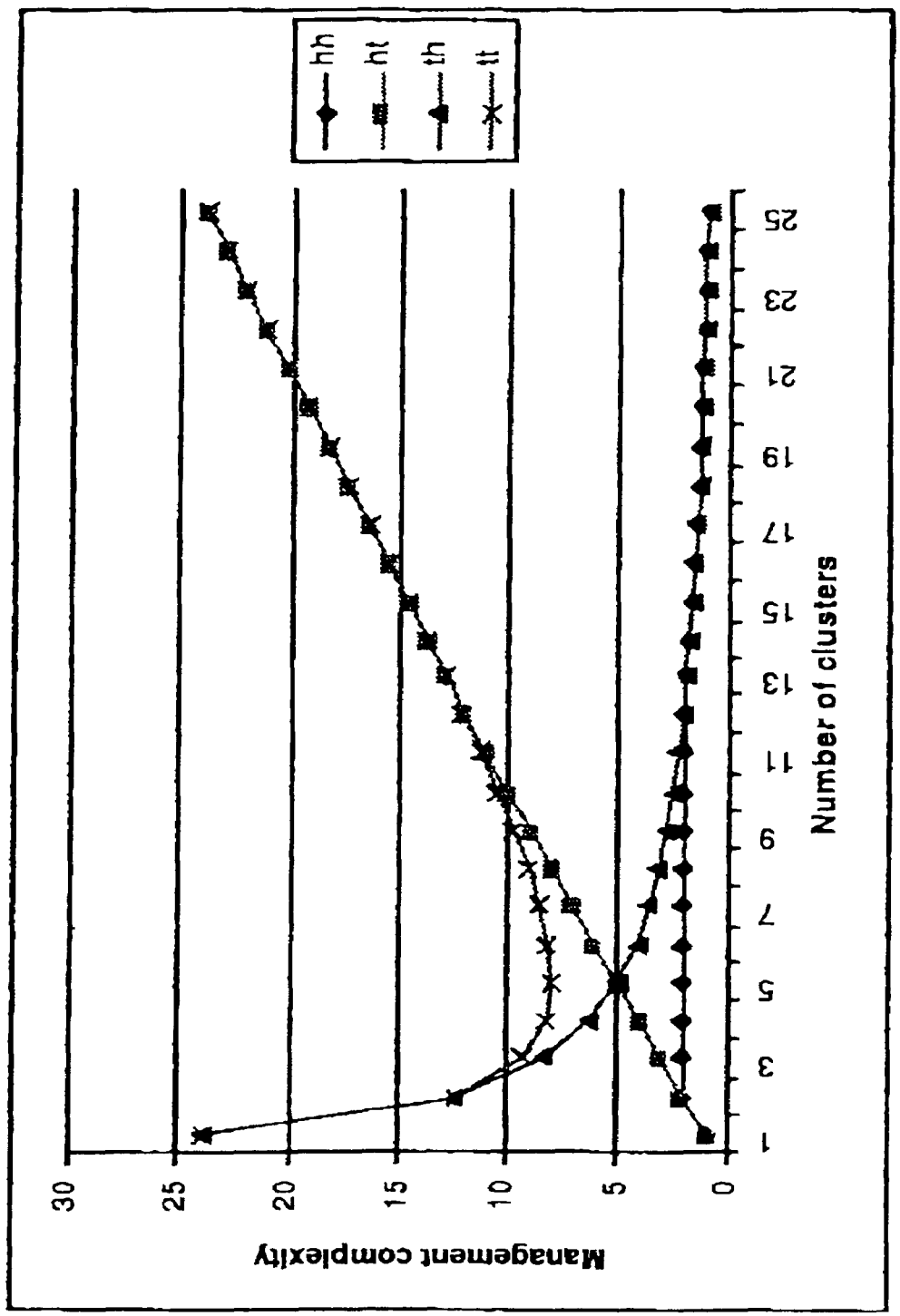
FIG. 12 illustrates the management complexity as a-function of the number of clusters with different dimensioning variants, for a large backbone reference network.

FIG. 12 presents the average number of bandwidth limitations per site, which is closely related to management complexity. Note, that although the pure hose and trunk provisioning is not displayed explicitly, their results can be seen in the figures, as they are equivalent to specific cases of the cluster-based methods: If there is one cluster then method 'ht' and 'hh' is equivalent to hose model and methods 'tt' and 'th' correspond to trunk model. If each site is in a separate cluster (i.e. when there are 25 clusters in the AT&T network) then 'hh' and 'th' corresponds to hose model and 'tt' and 'ht' is the trunk model.

Figure 13:
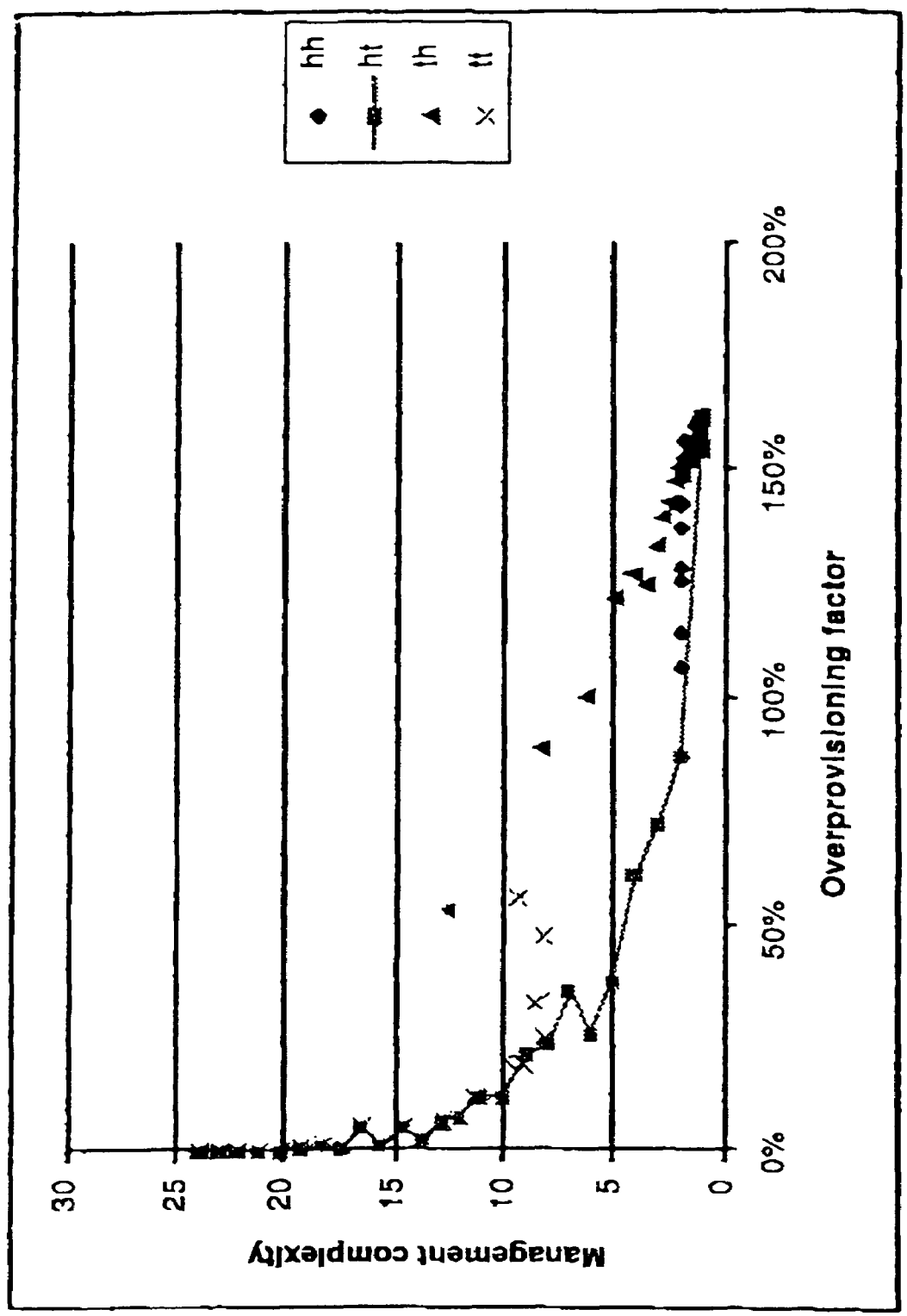
FIG. 13 illustrates the management complexity as a function of the overprovisioning factor with different dimensioning variants, for a large backbone reference network.

Results for all of the four variants of the cluster-based method are between the results of hose and trunk provisioning, regarding both link capacity and management complexity. The figures also highlight the trade-off between bandwidth efficiency and management complexity. To compare the variants, the real question is the necessary management complexity using a clustering that provides a certain targeted overprovisioning. The management complexity—overprovisioning scatterplot in FIG. 13 compares the variant from this point view. The dots represent the management complexity and overprovisioning values for the above cluster configurations. It can be seen that method 'ht' is the best in this sense on the AT&T network: it requires the least management complexity for any fixed overprovisioning. For example, by allowing 40% extra bandwidth in the backbone over the requirement of the trunk model, the needed configuration parameters in a site decreases from 25 to 5. Note that the hose model would require 160% extra bandwidth with a single parameter in each site.

The reason why hose provisioning is better than trunk provisioning on the intra-cluster level is that link capacities inside the cluster are not very sensitive to the provisioning method, but trunk model needs much more configuration parameters than hose. The small difference in capacities is because the topology of a cluster is typically close to a tree, which is the optimal scenario for the hose model, due to the sparse topology of the example AT&T backbone network.

For inter-cluster provisioning, trunk provisioning significantly overperforms the hose method because traffic to different clusters typically go via different paths. Thus, ignoring the destination clusters in the SLAs (i.e. using hose provisioning for inter-cluster traffic) means that the worst case traffic towards each cluster is the sum of all inter-cluster traffic as opposed to the trunk model where only the traffic of the specific destination cluster need to be considered.

In the following, the main focus will be on the performance of this intra-hose, inter-trunk variant from different aspects.

As mentioned previously, multi-level routing seems to be a promising way of improving network performance. In the case of multi-level routing, the cluster-level mechanism normally has precedence over the node level algorithm, which means the following: If shortest path routing is used both on the intra-cluster and inter-cluster level, then routing paths are generally chosen in such a way that they cross as few inter-cluster links as possible, and among these paths the least hop path is selected. This principle is applied to the other three routing scenarios as well.

From now on, the following names are used for the cluster-based routing variants for short reference:

'ss': Shortest path intra-cluster/Shortest path inter-cluster.
'st': Shortest path intra-cluster/Tree inter-cluster.
'ts': Tree intra-cluster/Shortest path inter-cluster.
'tt': Tree intra-cluster/Tree inter-cluster.

Note that each of the four routing scheme mentioned above may be implemented as a pure shortest path routing by assigning appropriate administrative weights to the links.

Figure 14:
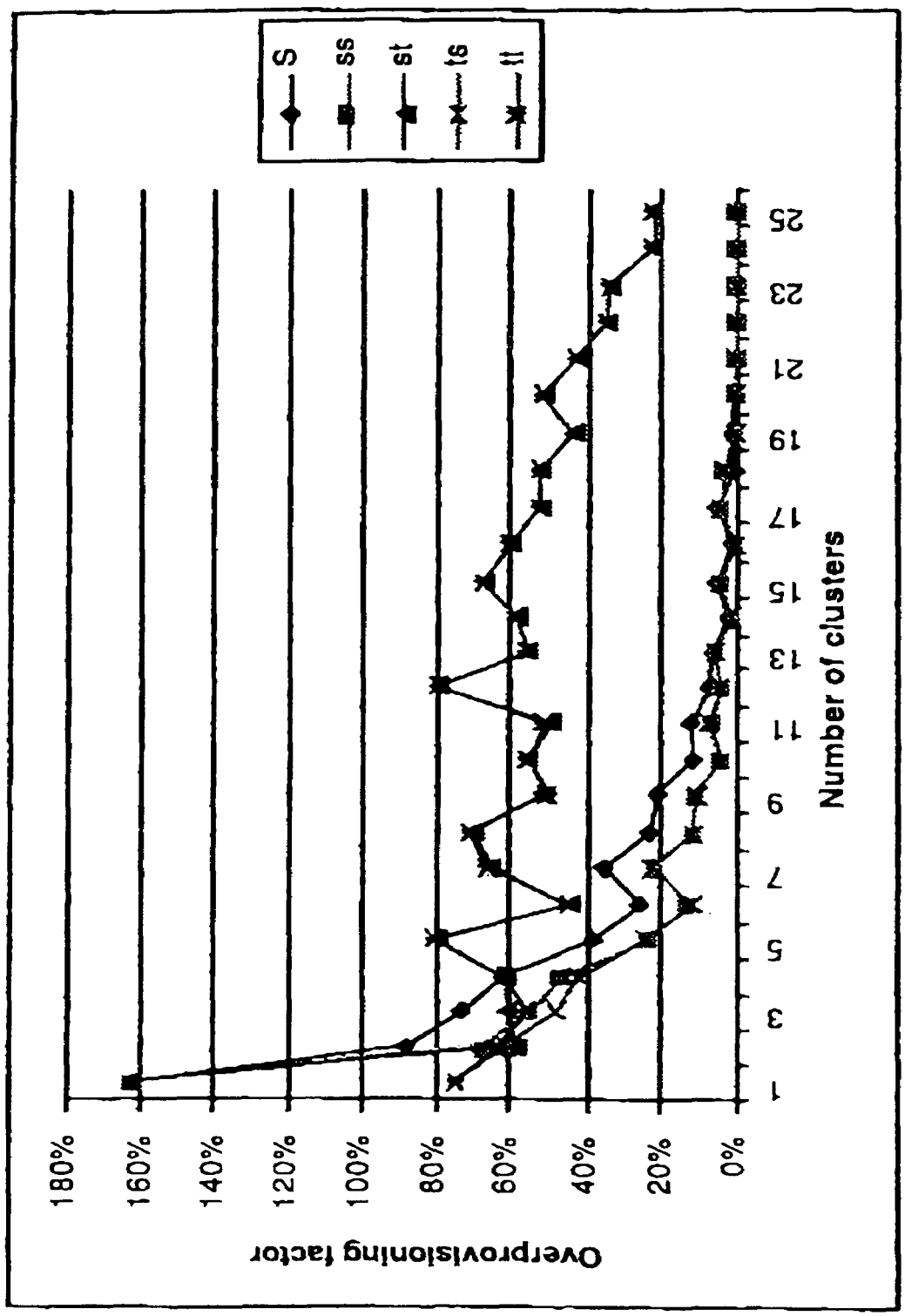
FIG. 14 illustrates the overprovisioning factor as a function of the number of clusters for different routing strategies with the intra-hose, inter-trunk model for a large backbone reference network.

FIG. 14 shows the overprovisioning factor of method 'ht' at the five investigated routing (Simple shortest plus the four routing strategies described above). A basic conclusion that can be drawn based on FIG. 14 is that using tree routing on the inter-cluster level results in worse performance than shortest path routing. The reason for the relatively bad performance of the inter-cluster tree is that it disables direct connection between many clusters, resulting in large detours. One can also observe that using tree or shortest path routing on the intra-cluster level does not make a significant difference. This is because the analyzed network is relatively sparse, thus the routing paths in the tree and shortest routing case are very similar. In case of more dense networks the tree routing on the intra-cluster level should perform better than the shortest path routing.

Similar tests were made for the other methods as well, and the results confirmed the expectation that using tree routing where hose dimensioning is applied and shortest path routing in network segments dimensioned based on trunk model are the best choices regarding the routing. Thus, there is a best routing type for each of our cluster-based methods, as follows:
routing 'tt' for method 'hh'
routing 'ts' for method 'ht'
routing 'st' for method 'th'
routing 'ss' for method 'tt'.

This confirmed the notion that performance such as bandwidth efficiency can be increased if routing is adjusted to the selected provisioning method.

We also investigated how the four methods perform with their best routing. With regard to management complexity as the function of overprovisioning at different dimensioning methods with optimal routing, the situation is very similar to that of using shortest path routing for each method. The most important difference is that one can not state that method 'ht' is the overall best, because it has been found that if the overprovisioning factor is 50% or higher, some 'th' and 'hh' configurations requires less management complexity to achieve the same overprovisioning, though the difference is almost negligible.

One may suspect that the efficiency of routing strategies is sensitive to the underlying topology. To investigate this, the proposed methods were also tested on randomly generated network topologies. First random topologies with the same number of nodes and links as the AT&T network were analyzed. The average link capacities of 10 different random graphs were computed for each of the four methods with their best routing, and it was found that there is no significant difference between the random case and the AT&T network, the method 'ht' apparently performs well on a generic topology as well.

Figure 15:
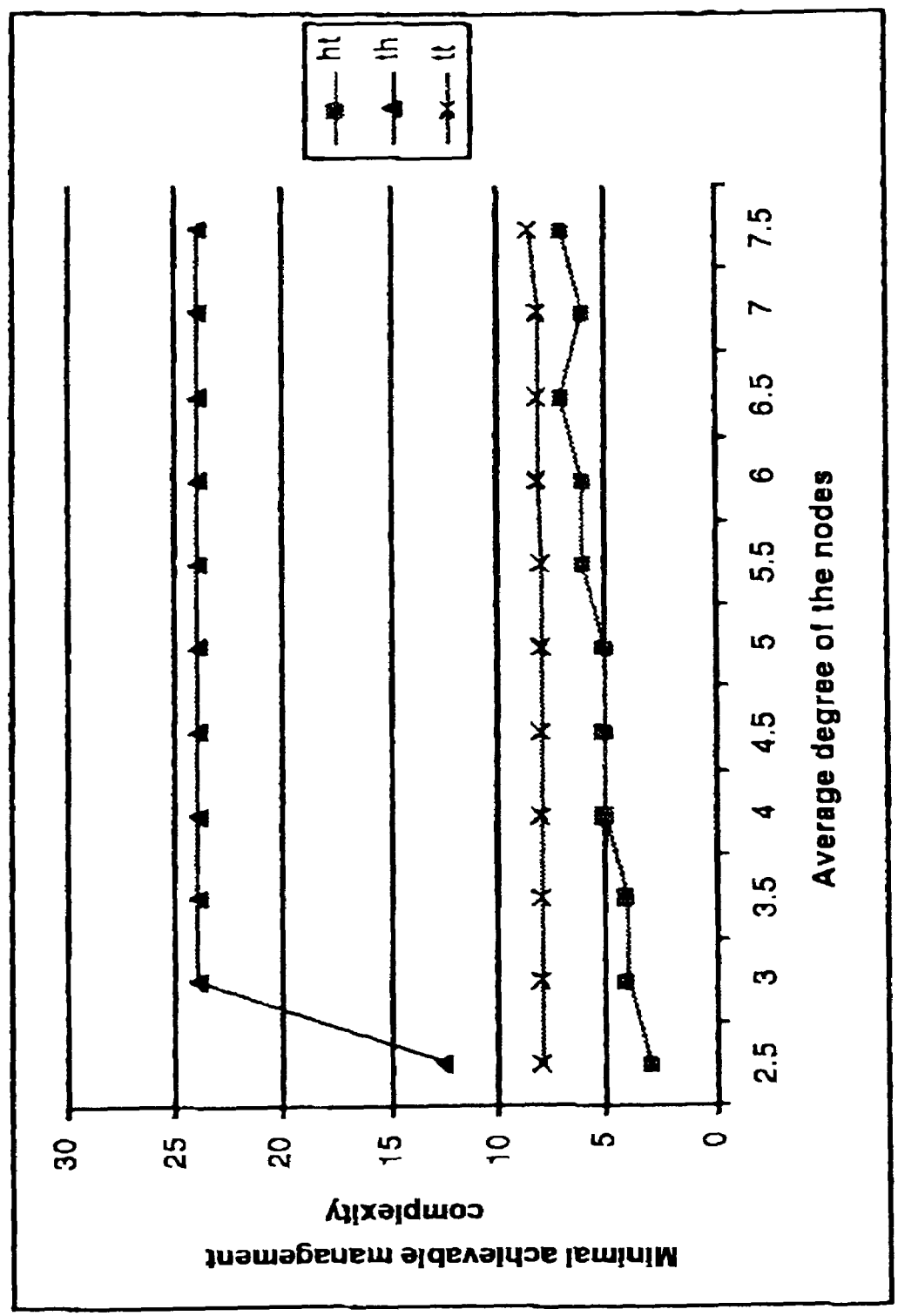
FIG. 15 illustrates the minimal achievable management complexity as a function of link density with different dimensioning variants.

The effect of link density of the network were also investigated by generating topologies with the same number of nodes (it was 25 in our exemplary case) while varying the average degree of the nodes (or equivalently varying the number of links in the network). The average link capacities of 10 different random graphs for 11 different average node degree from 2.5 to 7.5 in 0.5 steps were computed. Then the minimal management complexity providing an overdimensioning factor less than 50% was determined. FIG. 15 shows that method 'ht' still performs the best regardless of link density, but its performance gets worse and approaches the curve of 'tt' as the number of link in the network increases. Note that the curve of method 'hh' is missing because there is no configuration of that method which could fulfill the target 50% overprovisioning at any network density.

Figure 16:
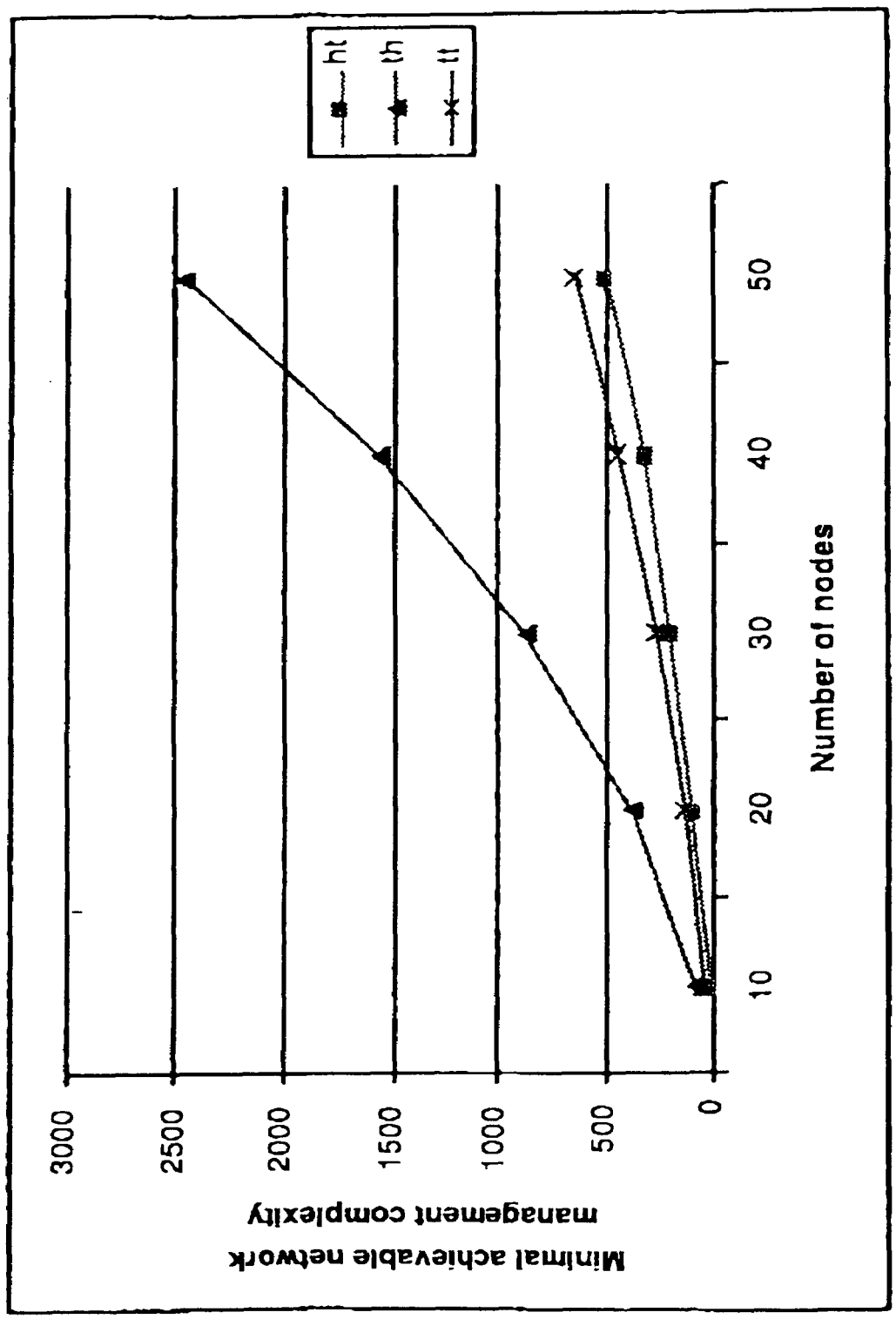
FIG. 16 illustrates the minimal achievable management complexity for different scale networks.

Another important question is how the provisioning methods scale with the network size. So, this is the next step in the evaluation of the cluster-based provisioning methods. The studied networks were generated randomly as previously mentioned. As the number of interfaces in a router is limited and networks usually consist of routers with similar capabilities, we compared such networks in which the average degree of the nodes were kept constant—in our case it was 4—when changing the number of nodes. During the test we investigated networks consisting of 10 to 50 nodes in steps of 10. We investigated 10 different topologies and calculated the average of the network capacities for each scenario. We examined all four cluster-based provisioning methods with their best routing strategy at all possible number of clusters from 1 to the number of nodes. We then looked up the minimum management complexity among those configurations where the resulted overprovisioning factor was below 50%. FIG. 16 shows the minimal number of parameters to be configured in the whole network. The curve of the 'hh' method is missing again, which means that it cannot fulfill the target 50% overprovisioning neither in small nor in large networks. The curves of methods 'ht' and 'tt' are linear which indicates that the number of parameters to be configured increases proportionally to the number of nodes, the difference is that the 'ht' method provides smaller complexity. In contrast to them, the curve of the 'th' method is increases rapidly at higher number of network nodes suggesting that the method should typically not be used in large networks.

In backbone networks one of the most important requirement is fault tolerance. This fact motivated some tests to examine how much overprovisioning is needed to provide certain fault tolerance using traditional dimensioning methods and the proposed cluster based schemes. Tunneling techniques used for VPNs can be different. The major difference regarding protection methods is if the backbone is a routed IP network or an MPLS-based network.

If the VPN backbone is a routed IP network, then the route of packets is normally determined based on the actual content of the routing tables. As a result of a link failure, the routing tables of the affected routers will be then updated by routing protocols. When all routing tables are updated based on the changed link state information, the packets are routed via the shortest path considering only the remaining links. This process may take a few minutes. It also means that the protection path of a given flow depends on the failed link.

If the VPN backbone is an MPLS network, then the advanced failure handling features of MPLS can be used. One of the techniques for protection in MPLS is using backup label switched paths. In other words, two LSPs are usually set up between each pair of sites, a primary and a secondary. When all links are up then the primary LSP is used for communication. Whenever a link along the path of the primary LSP fails, traffic is rerouted to the secondary LSP. To ensure that the secondary LSP can be used in case of any failure along the path of the primary LSP, the two LSPs must be disjoint. As LSPs are set up before the actual link failure, the protection path of a given flow is independent of which link is failed. An advantage of this technique is the much faster fail-over time than IP routing. Note that fast re-route is another possibility for protection in MPLS networks, which is often used in combination with backup LSPs. It has even faster fail-over time than switching over to the backup LSP by creating a local detour between the nodes connected by the failed link.

The effect of protection methods in routed IP networks and in MPLS with backup LSPs was also examined, assuming shared protection for single link and single node failures. In other words, network dimensioning was performed in such a way that links will support the rerouted traffic in case of any link or any node fails, but only one at a time. In the case of a link failure the topology of the network and the route of flows change. When a node fails, then all of its links are removed from the topology and its traffic is also removed from the traffic matrix.

The effect of protection methods in the case of a routed native IP backbone was examined, and the results indicate that applying protection does not influence the relative performance of the four variants of cluster-based provisioning. With respect to the effect of routing strategies for method 'ht', the results suggest that the best routing strategy among the investigated ones is simple shortest path routing where administrative weights in the backbone are independent of clustering.

The effect of a path-protecting redundancy mechanism on the performance of cluster-based provisioning was also investigated. With respect to overprovisioning as a function of the number of clusters, the efficiency of the protection methods is similar for native IP VPNS and MPLS-based VPNs. The effect of routing strategies on the required overprovisioning for the cluster-based methods was also studied, and here one can see that using different routing strategies makes no significant difference in the result. The reason for this is that the applied routing strategies determine only how the administrative weights are set on the links in the network. Weights are configured to force the primary route to the aimed path in a routed IP network. In contrary, path protection is based on Edmonds' algorithm that chooses the primary and secondary paths such that the summed costs of the two paths will be minimal, so the shortest path and the primary path could be different.

In summary, the cluster-based provisioning method makes it possible to define point-to-multipoint(cluster) SLAs between VPN providers and customers. The proposed dimensioning algorithm calculates, preferably using linear programming, link capacities such that none of the links could get congested even at worst case traffic distribution constrained by point-to-cluster traffic limitations at network edges and assuming that routing is known in advance. The congestion-free network design allows the VPN customer to use non-adaptive real-time services over the VPN, which would be degraded in case of congestion. The dimensioning algorithm is clearly an inevitable tool for the VPN provider offering cluster-based SLAs and QoS guarantees, because the task of checking the availability of network resources manually is complex and no IP based resource reservation protocol supports it.

Based on the studied network examples, it can be concluded that the best among the four variants of the cluster-based provisioning, which needs the least number of configuration parameters to achieve the same overprovisioning target, was the one which used hose-like limitations for intra-cluster traffic and trunk-like limitations for inter-cluster traffic. This variant remained the best irrespectively of the network scenario, with and without protection and for optimized routing too.

It proved to be the best compromise between hose and trunk model. In the studied 25-node network, using five clusters decreased the number of bandwidth limitations per node from 24 to 5, and increased the required link bandwidth by 40% without route optimization compared to trunk model. At the same network, the extra capacity needed by the hose model was 160%.

Route optimization further decreased the overdimensioning of the cluster-based provisioning, in the above example of five clusters from 40% to 25%. A two-level routing strategy was the best for the selected intra-cluster-hose inter-cluster-trunk model, which applied tree routing inside each cluster and shortest path routing between clusters.

Tolerance for single failures in a routed IP network required 135% extra capacity for the trunk model. By using cluster-based provisioning with five clusters, the total link capacity increased with another 35% (with 170% compared to trunk without protection). Simple shortest path routing, which is independent of cluster definitions and thus the same for all VPNS, was generally the best routing strategy.

It was assumed during the simulations that clusters are selected with a close-optimal heuristics, which is followed by IP address allocation for VPNs sites. If cluster definition and address allocation has the above order then each cluster can be mapped to a single IP prefix, which means that each bandwidth limitation in the SLA can be assigned to a single IP prefix. However, if IP addressing of the VPN is rigid, then either the clusters need to be defined based on the IP addressing, which results in less gain in bandwidth efficiency, or cluster definitions include a list of IP addresses, which increases management complexity. So, the benefits of the cluster-based method can be fully exploited when IP addressing can be adjusted to clusters.

The embodiments described above are merely given as examples, and it should be understood that the present invention is not limited thereto. Further modifications, changes and improvements which retain the basic underlying principles disclosed herein are also within the scope of the invention.

| ABBREVIATIONS | |
|---|---|
| ATM | Asynchronous Transfer Mode |
| BW | Bandwidth |
| CAC | Connection Admission Control |
| CSPF | Constraint based Shortest Path First |
| GGSN | Gateway GPRS Support Node |
| HLR | Home Location Register |
| LSP | Label Switched Path |
| MBAC | Measurement Based Connection Admission Control |
| MGW | Media Gateway |
| MPLS | Multiple Protocol Label Switching |
| O & M | Operation and Maintenance |
| QoS | Quality of Service |
| RNC | Radio Network Controller |
| RTP | Real-time Transfer Protocol |
| SGSN | Serving GPRS Support Node |
| TIPI | Transport IP Infrastructure |
| UMTS | Universal Mobile Telecommunications System |
| VC/VP | Virtual Circuit/Virtual Path |

REFERENCES

[1] I. Szabó, "On call Admission Control for IP Telephony in Best Effort Networks", Computer Communications, 26 (2003) pp. 304-313.

[2] I. Szabó, "Performance evaluation of a New End-to-end Measurement Based Call Admission Control Scheme for Supporting IP Telephony", SCS, International Symposium on Performance Evaluation of Computer and Telecommunication Systems, Orlando, Fla., July 2001.

[3] J. A. Fingerhut, S. Suri, J. S. Turner, "Designing least-cost nonblocking broadband networks", Journal of Algorithms, Vol. 24, no. 2, pp. 287-309, August 1997.

[4] N. G. Duffield and P. Goyal and A. Greenberg and P. Mishra and K. K. Ramakrishnan and J. E. Van der Merwe, "A Flexible Model for Resource Management in Virtual Private Networks", ACM Sigcomm, San Diego, Calif., USA, August 1999.

[5] A. Kumar and R. Rastogi and A. Silberschatz and B. Yener, "Algorithms for Provisioning Virtual Private Networks in the Hose Model", ACM Sigcomm, Cambridge, Mass., USA, August 2001

[6] G. Italiano and R. Rastogi and B. Yener, "Restoration Algorithms for Virtual Private Networks in the Hose Model", IEEE Infocom, New York, USA, June 2002.

[7] Alpár Jüttner, István Szabó, and Áron Szentesi. "On bandwidth efficiency of the hose resource management model in virtual private networks", IEEE Infocom, April 2003.

[8] M. Minoux, "Network synthesis and optimum network design problems: Models, solution methods and applications", Networks, vol. 13, pp. 313-360, 1989.

[9] M. Pióro, A. Jüttner, J. Harmatos, Á. Szentesi, P. Gajowniczek, and A. Myslek, "Topological design of telecommunication networks: Nodes and links localization under demand constraints", in 17th International Teletraffic Congress, Salvador de Bahia, September 2001.

[10] M. Pióro, A. Myslek, A. Jüttner, J. Harmatos, and Á. Szentesi, "Topological design of MPLS networks", in Global Communication Conference (GLOBECOM 2001), San Antonio, Tex., USA, November 2001.

[11] M. Pióro and P. Gajowniczek, "Solving multicommodity integral flow problems by simulated allocation", Telecommunication Systems, vol. 1, no. 13, pp. 17 28, 1997.

[12] T. Cinkler, T. Henk, and G. Gordos, "Stochastic algorithms for design of thrifty single-failure-protected networks", DRCN 2000, 2000.

[13] M. Maliosz and T. Cinkler, "Methods for Optical VPN Design over Multifiber Wavelength Routing Networks", in Proc. ONDM, Budapest, Hungary, February 2003.

[14] M. Maliosz and T. Cinkler, "Optimizing Configuration of Virtual Private Networks", in Proc. Polish-Czech-Hungarian Workshop, September 2001, pp. 241 247.

[15] T. Cinkler and M. Maliosz, "Configuration of Protected Virtual Private Networks", in Proc. Third International Workshop on DESIGN OF RELIABLE COMMUNICATION NETWORKS, October 2001.

[16] K. G. Ramakrishnan, D. Mitra, and J. A. Morrison, "VPN DESIGNER: A Tool for Design of Multiservice Virtual Private Networks", in Proc. 8th International Telecom. Network Planning Symp, NETWORKS 98, Sorrento, Italy, 1998, pp. 153-158.

[17] Chen-Nee Chuah, "A Scalable Framework for IP-Network Resource Provisioning Through Aggregation and Hierarchical Control", University of California, Berkeley, 2001.

[18] M. Berkelaar and J. Dirks, "lp_solve 4.0", to be found at the ftp-server ftp://ftp.es.ele.tue.nl/pub/lp_solve.

The invention claimed is:

1. A computer-implemented apparatus for link capacity dimensioning for a communication network having a set of network nodes interconnected by links, said computer-implemented apparatus comprising:
a cluster selector for logically partitioning a number of said network nodes into clusters, each cluster having at least two nodes;
a service level controller for defining a cluster-based service level definition including intra-cluster level and inter-cluster level definitions, said cluster-based service-level definition including at least one hose-based limitation for intra-cluster traffic on the intra-cluster level and at least one trunk-based node-to-cluster limitation for inter-cluster traffic on the inter-cluster level; and
a dimensioning controller for dimensioning the capacity of a number of said links based on a cluster-based trunk model involving said at least one trunk-based node-to-cluster limitation for inter-cluster traffic on the inter-cluster level and a cluster-based hose model involving said at least one hose-based limitation for intra-cluster traffic on the intra-cluster level.

2. The computer-implemented apparatus for link capacity dimensioning according to claim 1, wherein said computer-implemented apparatus is arranged to calculate maximum traffic values of the links subject to constraints defined by said traffic limitations.

3. The computer-implemented apparatus for link capacity dimensioning according to claim 1, wherein said computer-implemented apparatus is arranged to select the clusters based on a given weighting between minimization of the number of admission control parameters and maximization of bandwidth efficiency.

4. The computer-implemented apparatus for link capacity dimensioning according to claim 1, wherein said at least one trunk-based node-to-cluster traffic limitation is defined to limit, for at least one given node in a given cluster, the amount of traffic in relation to at least one other cluster.

5. The computer-implemented apparatus for link capacity dimensioning according to claim 4, wherein said at least one trunk-based node-to-cluster traffic limitation includes:
at least one limitation defined to limit, for a given node in a given cluster, the amount of traffic to at least one other cluster; and
at least one limitation defined to limit, for said given node in said given cluster, the amount of traffic from at least one other cluster.

6. The computer-implemented apparatus for link capacity dimensioning according to claim 4, wherein said at least one trunk-based node-to-cluster limitation includes:
a first set of limitations defined to limit, for a given node in a given cluster, the amount of traffic to each of a first set of other clusters; and
a second set of limitations defined to limit, for said given node in said given cluster, the amount of traffic from each of a second set of other clusters.

7. An admission controller apparatus implemented using a computer for operation in a communication network having a set of network nodes interconnected by links, a number of said network nodes being logically divided into clusters and each cluster having at least two nodes, wherein said admission controller comprises apparatus comprises:
a cluster selector that defines a cluster-based service level definition including intra-cluster level and inter-cluster level definitions, said cluster-based service-level definition including at least one hose-based limitation for intra-cluster traffic on the intra-cluster level and at least one trunk-based node-to-cluster limitation for inter-cluster traffic on the inter-cluster level; and
an admission controller that exercises cluster-based admission control to control a number of connections present on the links on at least two levels based on the traffic limitations in said cluster-based service-level definition, including:
intra-cluster admission control based on a cluster-based hose model involving said at least one hose-based limitation for intra-cluster traffic on the intra-cluster level, and
inter-cluster admission control based on a cluster-based trunk model involving said at least one trunk-based node-to-cluster limitation for inter-cluster traffic on the inter-cluster level.

8. The admission controller apparatus according to claim 7, wherein said admission controller apparatus is arranged to define said clusters based on a given weighting between minimization of the number of admission control parameters and maximization of bandwidth efficiency.

9. The admission controller apparatus according to claim 7, wherein said at least one trunk-based node-to-cluster traffic limitation is defined to limit, for at least one given node in a given cluster, the amount of traffic in relation to at least one other cluster.

10. The admission controller apparatus according to claim 9, wherein said at least one trunk-based node-to-cluster traffic limitation includes:
at least one limitation defined to limit, for a given node in a given cluster, the amount of traffic to at least one other cluster; and
at least one limitation defined to limit, for said given node in said given cluster, the amount of traffic from at least one other cluster.

11. The admission controller apparatus according to claim 9, wherein said at least one trunk-based node-to-cluster limitation includes:
a first set of limitations defined to limit, for a given node in a given cluster, the amount of traffic to each of a first set of other clusters; and a second set of limitations defined to limit, for said given node in said given cluster, the amount of traffic from each of a second set of other clusters.

12. The admission controller apparatus according to claim 7, wherein said admission controller apparatus comprises means for performing cluster-based routing on at least two levels, including intra-cluster routing and inter-cluster routing.

13. The admission controller apparatus according to claim 12, wherein said means for performing cluster-based routing comprises:
   means for applying one of shortest path routing and tree routing on the intra-cluster routing level; and
   means for applying one of shortest path routing and tree routing on the inter-cluster routing level.

14. The admission controller apparatus according to claim 13, wherein said means for performing cluster-based routing comprises:
   means for applying shortest path routing on the inter-cluster level; and
   means for applying tree routing on the intra-cluster level.

15. A computer-implemented method for link capacity dimensioning a communication network having a set of network nodes interconnected by links, comprising:
   a cluster selector logically partitioning a number of said network nodes into clusters, each cluster having at least two nodes;
   a service level definition controller defining a cluster-based service level definition including intra-cluster level and inter-cluster level definitions, said cluster-based service-level definition including at least one hose-based limitation for intra-cluster traffic on the intra-cluster level and at least one trunk-based node-to-cluster limitation for inter-cluster traffic on the inter-cluster level; and
   a dimension controller dimensioning the capacity of a number of said links based on a cluster-based trunk model involving said at least one trunk-based node-to-cluster limitation for inter-cluster traffic on the inter-cluster level and a cluster-based hose model involving said at least one hose-based limitation for intra-cluster traffic on the intra-cluster level.

16. The method according to claim 15, further comprising calculating maximum traffic values of the links subject to constraints defined by said traffic limitations.

17. The method according to claim 15, wherein cluster selection is based on a given weighting between minimization of the number of admission control parameters and maximization of bandwidth efficiency.

18. The method according to claim 15, wherein said at least one trunk-based node-to-cluster traffic limitation is defined to limit, for at least one given node in a given cluster, the amount of traffic in relation to at least one other cluster.

19. The method claim 18, wherein said at least one trunk-based node-to-cluster traffic limitation includes:
   at least one limitation defined to limit, for a given node in a given cluster, the amount of traffic to at least one other cluster; and
   at least one limitation defined to limit, for said given node in said given cluster, the amount of traffic from at least one other cluster.

20. The method according to claim 18, wherein said at least one trunk-based node-to-cluster limitation includes:
   a first set of limitations defined to limit, for a given node in a given cluster, the amount of traffic to each of a first set of other clusters; and
   a second set of limitations defined to limit, for said given node in said given cluster, the amount of traffic from each of a second set of other clusters.

21. A computer-implemented admission control method for a communication network having a set of network nodes interconnected by links, a number of said network nodes being logically divided into clusters and each cluster having at least two nodes, the admission control method comprising:
   a cluster selector defining a cluster-based service level definition including intra-cluster level and inter-cluster level definitions, said cluster-based service-level definition including at least one hose-based limitation for intra-cluster traffic on the intra-cluster level and at least one trunk-based node-to-cluster limitation for inter-cluster traffic on the inter-cluster level; and
   an admissions controller exercising cluster-based admission control to control a number of connections present on the links on at least two levels based on the traffic limitations in said cluster-based service-level definition, including:
      intra-cluster admission control based on a cluster-based hose model involving said at least one hose-based limitation for intra-cluster traffic on the intra-cluster level, and
      inter-cluster admission control based on a cluster-based trunk model involving said at least one trunk-based node-to-cluster limitation for inter-cluster traffic on the inter-cluster level.

22. The admission control method according to claim 21, wherein said clusters are defined based on a given weighting between minimization of the number of admission control parameters and maximization of bandwidth efficiency.

23. The admission control method according to claim 21, wherein said at least one trunk-based node-to-cluster traffic limitation is defined to limit, for at least one given node in a given cluster, the amount of traffic in relation to at least one other cluster.

24. The admission control method according to claim 23, wherein said at least one trunk-based node-to-cluster traffic limitation includes:
   at least one limitation defined to limit, for a given node in a given cluster, the amount of traffic to at least one other cluster; and
   at least one limitation defined to limit, for said given node in said given cluster, the amount of traffic from at least one other cluster.

25. The admission controller according to claim 23, wherein said at least one trunk-based node-to-cluster limitation includes:
   a first set of limitations defined to limit, for a given node in a given cluster, the amount of traffic to each of a first set of other clusters; and
   a second set of limitations defined to limit, for said given node in said given cluster, the amount of traffic from each of a second set of other clusters.

26. The admission control method according to claim 21, further comprising performing cluster-based routing on at least two levels, including intra-cluster routing and inter-cluster routing.

27. The admission control method according to claim 26, wherein said cluster-based routing comprises:
   applying one of shortest path routing and tree routing on the intra-cluster routing level; and
   applying one of shortest path routing and tree routing on the inter-cluster routing level.

28. The admission control method according to claim 27, wherein said cluster-based routing comprises:
   applying shortest path routing on the inter-cluster level; and
   applying tree routing on the intra-cluster level.

* * * * *